United States Patent
Child

(10) Patent No.: US 11,502,869 B2
(45) Date of Patent: Nov. 15, 2022

(54) SMART DOORBELL

(71) Applicant: Vivint, Inc., Provo, UT (US)

(72) Inventor: Michael D. Child, Draper, UT (US)

(73) Assignee: VIVINT, INC., Provo, UT (US)

( * ) Notice: Subject to any disclaimer, the term of this patent is extended or adjusted under 35 U.S.C. 154(b) by 149 days.

(21) Appl. No.: 17/010,715

(22) Filed: Sep. 2, 2020

(65) Prior Publication Data
US 2020/0402374 A1    Dec. 24, 2020

Related U.S. Application Data

(63) Continuation-in-part of application No. 15/590,919, filed on May 9, 2017, now abandoned.

(51) Int. Cl.
| | | |
|---|---|---|
| *H04L 12/28* | (2006.01) | |
| *G08B 7/06* | (2006.01) | |
| *G06F 3/16* | (2006.01) | |

(52) U.S. Cl.
CPC .......... *H04L 12/2829* (2013.01); *G06F 3/165* (2013.01); *G08B 7/06* (2013.01); *H04L 12/282* (2013.01); *H04L 12/2825* (2013.01); *H04L 2012/2847* (2013.01)

(58) Field of Classification Search
CPC . G05B 15/02; G05B 2219/2642; G06F 3/165; G06F 19/00; G08B 7/06; H04L 12/2803; H04L 12/282; H04L 12/2829; H04L 2012/2849; H04N 21/442; H04N 21/43615; H04N 2005/4444
See application file for complete search history.

(56) References Cited

U.S. PATENT DOCUMENTS

| | | |
|---|---|---|
| 6,236,622 B1 | 5/2001 | Blackman |
| 6,536,675 B1 | 3/2003 | Pesko et al. |
| 8,560,128 B2 | 10/2013 | Ruff et al. |
| 8,768,520 B2 | 7/2014 | Oexman et al. |
| 9,019,111 B1 | 4/2015 | Sloo et al. |
| 9,046,414 B2 | 6/2015 | Fadell et al. |

(Continued)

FOREIGN PATENT DOCUMENTS

WO     2013134160 A2     9/2013

OTHER PUBLICATIONS

International Search Report and Written Opinion of the International Searching Authority, PCT/US2018/031109, dated Nov. 11, 2018.

*Primary Examiner* — Crystal J Barnes-Bullock
(74) *Attorney, Agent, or Firm* — Kunzler Bean & Adamson

(57) ABSTRACT

A method for adjusting devices upon detecting occupant is asleep in a security/automation system is described. In one embodiment, the method may include monitoring sensor data from one or more sensors, detecting an occupant sleeping, based at least in part on the monitored sensor data, and upon detecting the occupant sleeping, modifying one or more settings associated with one or more devices of the home automation system. In some cases, the method may include modifying at least one of an audio setting associated with the home automation system, a thermostat setting associated with the home automation system, a sensor setting associated with the home automation system, an appliance setting associated with the home automation system, and a security setting associated with the home automation system, or any combination thereof.

20 Claims, 9 Drawing Sheets

(56) References Cited

U.S. PATENT DOCUMENTS

| | | |
|---|---|---|
| 9,065,987 B2 | 6/2015 | Kasmir et al. |
| 9,110,450 B2 | 8/2015 | Alberth, Jr. et al. |
| 9,619,985 B2 | 4/2017 | Stricker et al. |
| 9,786,133 B2 * | 10/2017 | Harrison .......... G08B 13/19617 |
| 9,807,851 B2 | 10/2017 | Child et al. |
| 9,900,173 B2 * | 2/2018 | Robinson ............ G05D 23/1928 |
| 9,940,801 B2 | 4/2018 | Phillips |
| 9,943,261 B2 | 4/2018 | Yoon et al. |
| 10,027,920 B2 | 7/2018 | Freiin Von Kapri et al. |
| 10,140,593 B2 * | 11/2018 | De Mel .................... G08B 3/10 |
| 10,149,549 B2 * | 12/2018 | Erko .................... A47C 27/082 |
| 2009/0034748 A1 | 2/2009 | Sibbald |
| 2013/0226354 A9 | 8/2013 | Ruff et al. |
| 2015/0156031 A1 | 6/2015 | Fadell et al. |
| 2015/0217082 A1 | 8/2015 | Kang et al. |
| 2016/0022218 A1 | 1/2016 | Hayes et al. |
| 2016/0047565 A1 | 2/2016 | Robinson |
| 2016/0195856 A1 | 7/2016 | Spero |
| 2016/0234034 A1 | 8/2016 | Mahar et al. |
| 2016/0300474 A1 | 10/2016 | Warren et al. |
| 2016/0379471 A1 | 12/2016 | Eyring et al. |
| 2017/0035212 A1 | 2/2017 | Erko et al. |
| 2017/0068782 A1 | 3/2017 | Pillai et al. |
| 2017/0084131 A1 | 3/2017 | Harrison et al. |
| 2017/0294097 A1 | 10/2017 | Webb |
| 2018/0033287 A1 * | 2/2018 | De Mel .............. G06Q 10/1093 |
| 2018/0052655 A1 | 2/2018 | Hannibal et al. |
| 2018/0177974 A1 | 6/2018 | Laporte et al. |
| 2018/0285463 A1 | 10/2018 | Choi et al. |

* cited by examiner

SMART DOORBELL

CROSS-REFERENCE TO RELATED APPLICATIONS

The present application is a continuation-in-part of U.S. patent application Ser. No. 15/590,919, titled: "ADJUSTING DEVICES UPON DETECTING OCCUPANT IS ASLEEP," filed on May 9, 2017, the disclosure of which is incorporated by reference herein in its entirety.

BACKGROUND

The present disclosure, for example, relates to security and/or automation systems, and more particularly to adjusting devices upon detecting occupant is asleep.

Security and automation systems are widely deployed to provide various types of communication and functional features such as monitoring, communication, notification, and/or others. These systems may be capable of supporting communication with a user through a communication connection or a system management action.

Present security and automation system may include one or more sensors for monitoring a home or a commercial business. These systems typically employ sensors at entry and exit points, along with interior sensors (e.g., motion detectors, sound sensors, and glass break sensors) for determining entry or exit into or out of a property. In some cases, an occupant of a premises may not wish to be disturbed. For example, the occupant may lie down for a nap and/or a baby may be sleeping. In such examples, the occupant(s) of the premises may be interrupted by various noises, unexpected disturbances, etc. A system utilizing one or more sensors to minimize such disturbances may be desired.

SUMMARY

The present systems and methods may improve operations of a security/automation system in relation to an occupant of a premises taking a nap. A method for adjusting devices upon detecting occupant is asleep in a security/automation system is described.

In one embodiment, the method may include monitoring sensor data from one or more sensors, detecting an occupant sleeping, based on the monitored sensor data, and upon detecting the occupant sleeping, modifying one or more settings associated with one or more devices of a home automation system.

In some cases modifying one or more settings includes modifying at least one of an audio setting associated with the home automation system, a thermostat setting associated with the home automation system, a sensor setting associated with the home automation system, an appliance setting associated with the home automation system, and a security setting associated with the home automation system, or any combination thereof. Additionally, or alternatively, modifying the audio setting associated with the home automation system includes at least one of adjusting volume of a chime of a doorbell associated with the home automation system, muting the chime of the doorbell, bypassing the chime of the doorbell, modifying the chime of the doorbell from a first type of chime to a second type of chime, muting one or more speakers located within the home, and activating a sound machine near a location of the occupant, or any combination thereof.

In some embodiments, the method may include retrieving an occupant preferences profile, identifying a predefined room temperature from the occupant preferences profile, and adjusting the thermostat to the predefined room temperature. In some cases, modifying the sensor setting associated with the home automation system includes at least one of adjusting one or more light sensors to an ambient light setting, activating one or more motion sensors within the home, adjusting a humidity sensor, and adjusting a threshold of a proximity sensor, or any combination thereof.

In some embodiments, the method may include detecting a doorbell at the home being rung and routing a doorbell notification to an alternative destination. In some cases, the doorbell notification may include at least one of a sound played on a mobile device, a notification displayed on a home automation application, a message displayed on the mobile device, a message displayed on a television screen, a message displayed on a control panel of the home automation system, and flashing a light of a sensor of the home automation system, or any combination thereof.

In some embodiments, the method may include identifying a room where the occupant is sleeping, activating a motion sensor in the room where the occupant is sleeping, adjusting one or more lights to an ambient level in the room where the occupant is sleeping and muting or adjusting a setting of a speaker in the room where the occupant is sleeping. In some embodiments, the method may include measuring a noise level at the room where the occupant is sleeping. Upon detecting that the noise level exceeds a predetermined threshold, the method may include adjusting an aspect of the sound being played in the room to decrease the noise level below the predetermined threshold.

In some cases, detecting the occupant sleeping includes at least one of identifying from an occupant profile, a scheduled nap time set for a predetermined period of time, detecting the occupant in a bedroom remaining still for a predetermined amount of time, detecting a sound machine being activated, and monitoring a vital sign of the occupant that includes at least one of pulse, heart rate, breathing, and breathing rate, and detecting the occupant sleeping based on the monitored vital signs, or any combination thereof.

In some embodiments, the method may include detecting a doorbell at the home being rung, identifying a presence of a second occupant in the home, the second occupant different from the occupant, and providing a doorbell notification to the second occupant of the home based on detecting the occupant napping.

In some embodiments, upon determining the occupant is awake after a nap, the method may include restoring at least one of an audio setting associated with the home automation system to a default mode, a thermostat setting associated with the home automation system to the default mode, a sensor setting associated with the home automation system to the default mode, an appliance setting associated with the home automation system to the default mode, and a security setting associated with the home automation system to the default mode, or any combination thereof.

An apparatus for adjusting devices upon detecting occupant is asleep is also described. In one embodiment, the apparatus may include a processor, memory in electronic communication with the processor, and instructions stored in the memory, the instructions being executable by the processor to perform the steps of monitoring sensor data from one or more sensors, detecting an occupant sleeping, based on the monitored sensor data, and upon detecting the occupant sleeping, modifying one or more settings associated with one or more devices of a home automation system. In some cases modifying one or more settings includes modifying at least one of an audio setting associated with the home automation system, a thermostat setting associated with the home automation system, a sensor setting associated with the home automation system, an appliance setting associated with the home automation system, and a security setting associated with the home automation system, or any combination thereof.

Additionally, or alternatively, modifying the audio setting associated with the home automation system includes at least one of adjusting volume of a chime of a doorbell associated with the home automation system, muting the chime of the doorbell, bypassing the chime of the doorbell, modifying the chime of the doorbell from a first type of chime to a second type of chime, muting one or more speakers located within the home, and activating a sound machine near a location of the occupant, or any combination thereof.

In some cases, the instructions are further executable by the processor to perform the steps of retrieving an occupant preferences profile, identifying a predefined room temperature from the occupant preferences profile and adjusting the thermostat to the predefined room temperature. In some embodiments, modifying the sensor setting associated with the home automation system includes at least one of adjusting one or more light sensors to an ambient light setting, activating one or more motion sensors within the home, adjusting a humidity sensor, and adjusting a threshold of a proximity sensor, or any combination thereof.

In some cases, the instructions are further executable by the processor to perform the steps of detecting a doorbell at the home being rung and routing a doorbell notification to an alternative destination. In some cases, the doorbell notification may include at least one of a sound played on a mobile device, a notification displayed on a home automation application, a message displayed on the mobile device, a message displayed on a television screen, a message displayed on a control panel of the home automation system, and flashing a light of a sensor of the home automation system, or any combination thereof.

In some embodiments, the instructions are further executable by the processor to perform the steps of identifying a room where the occupant is sleeping, activating a motion sensor in the room where the occupant is sleeping, adjusting one or more lights to an ambient level in the room where the occupant is sleeping, and muting a speaker in the room where the occupant is sleeping.

A non-transitory computer-readable medium is also described. The non-transitory computer readable medium may store computer-executable code, the code being executable by a processor to perform the steps of monitoring sensor data from one or more sensors, detecting an occupant sleeping, based on the monitored sensor data, and upon detecting the occupant sleeping, modifying one or more settings associated with one or more devices of a home automation system. In some cases modifying one or more settings includes modifying at least one of an audio setting associated with the home automation system, a thermostat setting associated with the home automation system, a sensor setting associated with the home automation system, an appliance setting associated with the home automation system, and a security setting associated with the home automation system, or any combination thereof.

A method at a security and/or automation system associated with a premises, the method being performed by a computing device including at least one processor, is described. The method may include determining that the security and/or automation system is operating in a first mode, modifying an audio setting of the security and/or automation system based on determining that the security and/or automation system is operating in the first mode, detecting an interaction with a doorbell of the premises associated with the security and/or automation system, muting a sound of the doorbell based on detecting the interaction with the doorbell and the modified audio setting, and providing, in response to muting the sound of the doorbell, a message at the doorbell indicating that the sound of the doorbell is muted.

An apparatus at a security and/or automation system associated with a premises is described. In some examples, the apparatus may be an example of a computing device. The apparatus may include at least one processor, memory coupled with the processor, and instructions stored in the memory. The instructions may be executable by the processor to cause the apparatus to determine that the security and/or automation system is operating in a first mode, modify an audio setting of the security and/or automation system based on determining that the security and/or automation system is operating in the first mode, detect an interaction with a doorbell of the premises associated with the security and/or automation system, mute a sound of the doorbell based on detecting the interaction with the doorbell and the modified audio setting, and provide, in response to muting the sound of the doorbell, a message at the doorbell indicating that the sound of the doorbell is muted.

Another apparatus at a security and/or automation system associated with a premises is described. The apparatus may include means for determining that the security and/or automation system is operating in a first mode, modifying an audio setting of the security and/or automation system based on determining that the security and/or automation system is operating in the first mode, detecting an interaction with a doorbell of the premises associated with the security and/or automation system, muting a sound of the doorbell based on detecting the interaction with the doorbell and the modified audio setting, and providing, in response to muting the sound of the doorbell, a message at the doorbell indicating that the sound of the doorbell is muted.

A non-transitory computer-readable medium storing code is also described. The non-transitory computer readable medium may store computer-executable code, the code being executable by a processor to perform the steps of determining that the security and/or automation system is operating in a first mode, modifying an audio setting of the security and/or automation system based on determining that the security and/or automation system is operating in the first mode, detecting an interaction with a doorbell of the premises associated with the security and/or automation system, muting a sound of the doorbell based on detecting the interaction with the doorbell and the modified audio setting, and providing, in response to muting the sound of the doorbell, a message at the doorbell indicating that the sound of the doorbell is muted.

Some examples of the method, apparatuses, and non-transitory computer-readable medium described herein may further include operations, features, means, or instructions for detecting a second interaction with the doorbell based on providing the message, and emitting the sound of the doorbell based on detecting the second interaction with the doorbell.

In some examples of the method, apparatuses, and non-transitory computer-readable medium described herein, the message includes an audio message, a display message, an indication that an occupant of the premises may be sleeping, an indication that the security and/or automation system may be operating in the first mode, a query of an identity of a person interacting with the doorbell, a query of an intent of the person interacting with the doorbell, an instruction to interact with the doorbell, or any combination thereof.

Some examples of the method, apparatuses, and non-transitory computer-readable medium described herein may further include operations, features, means, or instructions for determining a doorbell notification based on detecting the interaction with the doorbell, and routing the doorbell notification to an alternative destination based on muting the sound of the doorbell.

In some examples of the method, apparatuses, and non-transitory computer-readable medium described herein, the doorbell notification includes at least one of a sound emitted from a mobile device, a notification displayed on a home automation application, a message displayed on the mobile device, a message displayed on a television screen, a message displayed on a control panel of the security and/or automation system, and flashing a light of a sensor of the security and/or automation system, or any combination thereof.

Some examples of the method, apparatuses, and non-transitory computer-readable medium described herein may further include operations, features, means, or instructions for determining that the security and/or automation system may be operating in a second mode, detecting a second interaction with the doorbell of the premises associated with the security and/or automation system, and refraining from muting a second sound of the doorbell based on determining that the security and/or automation system may be operating in the second mode.

Some examples of the method, apparatuses, and non-transitory computer-readable medium described herein may further include operations, features, means, or instructions for receiving an input from an individual associated with the security and/or automation system, where determining that the security and/or automation system may be operating in the first mode may be based on the received input.

Some examples of the method, apparatuses, and non-transitory computer-readable medium described herein may further include operations, features, means, or instructions for identifying one or more settings associated with the security and/or automation system, where determining that the security and/or automation system may be operating in the first mode may be based on the one or more settings.

In some examples of the method, apparatuses, and non-transitory computer-readable medium described herein, the one or more settings include at least one of a do-not-disturb time period, a noise threshold, an occupancy of the premises, or any combination thereof.

Some examples of the method, apparatuses, and non-transitory computer-readable medium described herein may further include operations, features, means, or instructions for monitoring sensor data from one or more sensors associated with the security and/or automation system, and detecting an occupant sleeping based on the monitored sensor data, where determining that the security and/or automation system may be operating in the first mode may be based on detecting the occupant sleeping.

In some examples of the method, apparatuses, and non-transitory computer-readable medium described herein, the first mode includes a do-not-disturb mode.

In some examples of the method, apparatuses, and non-transitory computer-readable medium described herein, the security and automation system includes a camera sensor, a motion sensor, a speaker, a control panel, a transceiver, the doorbell, a light, or any combination thereof.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

Figure 1:
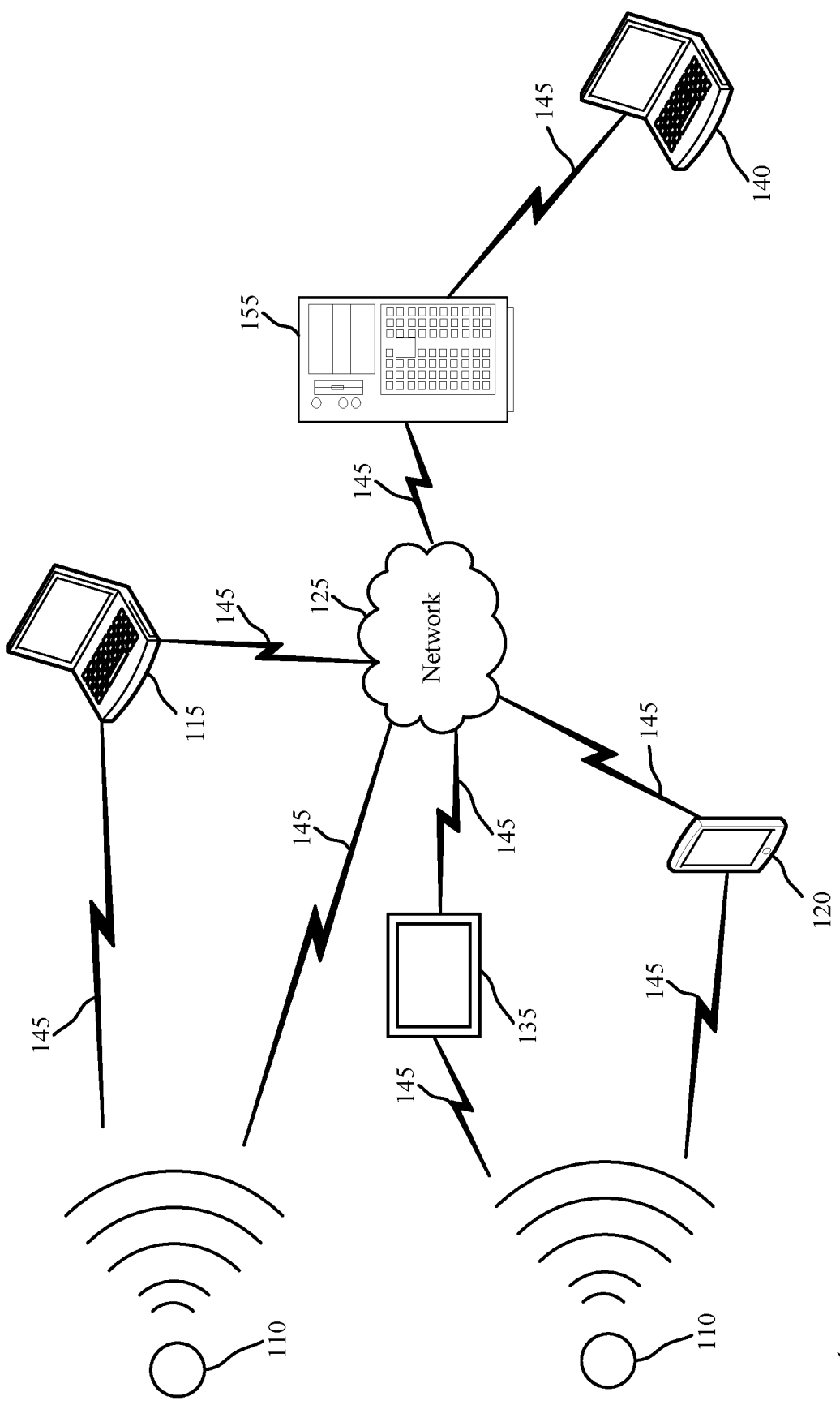
FIG. 1 is a block diagram of an example of a security and/or automation system in accordance with various embodiments.

Present security and automation systems (or systems), e.g., for homes and commercial businesses, may employ sensors at entry and exit points, along with interior sensors (e.g., motion detectors, sound sensors, and glass break sensors) for determining entry or exit into or out of a property or occupancy within a property. In addition, these security and automation systems may employ security cameras that perform various operations related to crime or other circumstances. More specifically, the systems and methods described herein relate to controlling or otherwise modifying access to a home or business based on identifying that an occupant does not wish to be interrupted. The term "home" used throughout this document generically refers to any dwelling or property that is monitored by a monitoring system such as an automation system and/or a security system. An automation system may include automation and security features. The term "security and automation system" may be used herein to describe a security system, an automation system, a smart home security and/or automation system, which may provide automation and/or security functionality.

Often times, when an occupant falls asleep, they forget to adjust devices in a smart home. For example, occupants usually prefer to have a lower home temperature while napping and a higher home temperature, while they are awake. However, it may be frustrating for the occupant to adjust all devices prior to taking a nap. Also, parents of toddlers and newborns are often frustrated when a noise happens just after lying down their child for a nap. One common occurrence is a doorbell being rung just after the child goes down for a nap. Also, after lying the child down for a nap, the parent may be out of earshot when the child wakes up. Accordingly, benefits may be achieved from systems and methods to adjust devices on a home automation system to minimize potential disturbances while an occupant is napping or would otherwise wish not to be disturbed.

In one embodiment, a home automation system may monitor sensor data from one or more sensors. The home automation system may then determine an occupant is sleeping. For example, in conjunction with one or more sensors, the home automation system may detect an occupant (e.g., baby, child, parent) lying down in a room of a home and then lying still. Based on these detected events, the system may detect that an occupant is asleep. In some cases, the system may detect a sleep sound machine being turned on and played (e.g., soothing sounds such as a running river, ocean waves, rain, etc.). Upon detecting the sleep sound machine being played, the system may detect that an occupant is either sleeping or getting ready for a nap. In some embodiments, the system may monitor a vital sign of an occupant (e.g., breathing, breathing rate, pulse, heart rate, etc.) and based on the monitored vital sign, the system may detect that an occupant is sleeping. In some cases, the system may be programmed to determine that an occupant takes a nap based on a set schedule. For example, the system may be programmed to detect that an occupant naps every day from 1:00 PM until 3:00 PM. In some embodiments, the system may study nap patterns of an occupant to determine the napping schedule. In some examples, an occupant may submit a command via a control panel of the home automation system, via a mobile application on a mobile device, and/or via a voice command such as "System, start nap time for the baby."

Upon detecting the occupant sleeping, the system may modify one or more settings associated with one or more devices of the home automation system. For example, the system may modify a combination an audio setting, a thermostat setting, a sensor setting, an appliance setting, and a security setting. For example, the home automation system may adjust volume of a chime of a doorbell associated with the home automation system, mute the chime of the doorbell, bypass the chime of the doorbell, modify the chime of the doorbell from a first type of chime to a second type of chime, mute one or more speakers located within the home, and activate a sound machine near a location of the occupant. Additionally, or alternatively, the doorbell may be configured to play a chime over one or more speakers at the home. In some cases, the doorbell may be configured to play a chime and/or display a notification on a mobile device. Accordingly, upon detecting that an occupant is sleeping, the system may perform at least one of reduce a volume of the dedicated doorbell chime, deactivate or mute the dedicated doorbell chime.

Additionally or alternatively, the home automation system may retrieve an occupant preferences profile, upon detecting that the occupant is sleeping. In some examples, the system may adjust the room temperature according to the occupant preferences profile. The system may also identify a room where the occupant is sleeping and play a doorbell chime over a first speaker in a room where an awake occupant is and bypass playing the doorbell chime over a second speaker in a room where the occupant is sleeping. In some embodiments, the system may modify one or more light sensors to an ambient light setting, activate one or more motion sensors within the home, adjust a humidity sensor, and adjust a threshold of a proximity sensor. Accordingly, in some embodiments, upon detecting an occupant sleeping, the system may activate a motion sensor in the room where the occupant is sleeping. Upon detecting a doorbell being rung at the home, the system may reduce a volume of a dedicated doorbell chime, mute the dedicated doorbell chime, bypass a dedicated chime, send a doorbell notification to a control panel (e.g., display text, play sound, flashing light, etc.), flash a light on a sensor, flash a security or strobe light, etc., send a doorbell notification to an alternative destination such as a mobile device, a television screen, send a notification to an alternative destination such as a text message to a mobile device, audio notification played via a mobile application installed on a mobile device, audio notification played through a speaker in a first room while bypassing playing the audio notification through a speaker in a second room, displaying a notification on a television screen, etc. In some cases, the system may route the doorbell notification to an alternative destination/

In some embodiments, the system may activate one or more sensors of the home automation system upon detecting an occupant sleeping. In some cases, the system may mute a speaker in the room where the occupant is sleeping. In some embodiments, the system may play sound machine (ocean, rain, running river, etc.) over the speaker in the room. In some embodiments, the system may activate a heating unit in the room via an appliance module (e.g. spacer heater connected to an appliance module). In some cases, the system may monitor one or more vital signs of the napping occupant and generate notifications based on the monitored vital signs. In some cases, the system may monitor vital signs of the occupant in a period interval.

In some embodiments, the system may detect when a sleeping occupant is waking up and/or is awake. For example, the system may detect movement, sound, and or monitored vital signs that indicate the occupant that was napping is now awake. Upon determining the occupant is now awake, the system may generate a notification indicating the occupant is awake from his/her nap. In some cases, upon determining the occupant is awake after a nap, the system may restore a combination of an audio setting associated with the home automation system to a default mode, a thermostat setting to the default mode, a sensor setting to the default mode, an appliance setting to the default mode, and a security setting to the default mode. In some cases, the default mode may be generated from an occupant preferences profile.

In some embodiments, the system may be enabled with one or more smart doorbell techniques. For example, an individual associated with the system (e.g., an occupant) may wish not to be disturbed (e.g., the individual may be asleep, a child may be asleep, the individual may program one or more settings, etc.). Accordingly, the system may operate in a first mode, such as a do-not-disturb mode. For example, the system may receive an input from an individual to operate in the first mode, the system may identify one or more settings associated with operating in the first mode (e.g., a do-not-disturb time period, a noise threshold, an occupancy of the premises, or any combination thereof), the system may operate in the first mode upon detecting that an occupant is sleeping based on monitored sensor data, or any combination thereof. In some examples, the system (e.g., security and automation system) may be configured to detect that an occupant is sleeping based on monitoring at least a zone of the premises. For instance, the system may include a camera configured to monitor a zone (e.g., a room) within the premises. The system may detect a person in the zone, for example using the camera, a motion sensor, or another sensor. In some examples, the sensors of the system may be configured to detect a presence of a person within a residence. For example, the system may detect the presence of the person based on detecting and analyzing sounds occurring within the residence. In some cases, the system may detect motion within the residence, and may analyze the detected motion to infer that a person is present inside the residence. In some embodiments, the system may determine that the person has remained in the zone for a duration of time (e.g., a threshold duration), which may indicate the detected person is sleeping.

In some cases, the system may modify one or more audio settings based on determining that the system is operating in the first mode (i.e., upon either determining that an occupant has indicated the first mode via an input or determining that an occupant is asleep). In some cases, modifying the one or more audio settings may include modifying an audio setting of a chime connected to a doorbell at a premises associated with the home automation system. For example, modifying the audio setting associated with the home automation system may include adjusting a volume of a chime of a doorbell, muting the chime of the doorbell, bypassing the chime of the doorbell, modifying the chime of the doorbell from a first type of chime to a second type of chime, muting one or more speakers located within the home, activating a sound machine near a location of the occupant, or any combination thereof.

Additionally or alternatively, the system may detect an interaction with a doorbell of the premises associated with the system. In some cases, detecting the interaction with the doorbell may be based on an individual (e.g., a visitor) pressing a doorbell button or otherwise activating a doorbell function of the system. The system may perform one or more actions based on an operating mode and detecting the interaction with the doorbell. For example, the system may operate in the first mode and mute a sound of the doorbell based on detecting the interaction with the doorbell and an audio setting associated with the first mode. In some cases, the system may route a doorbell notification to an alternative destination (e.g., to a device associated with an occupant of the system). The system may provide, in response to muting the sound of the doorbell, a message at the doorbell indicating that the sound of the doorbell is muted. In some cases, the message may indicate to interact with the doorbell a second time if one or more conditions are satisfied. As an illustrative example, the message may instruct a visitor at the doorbell to press the doorbell a second time if they are not a solicitor, if there is an emergency, etc. Additionally or alternatively, the message may indicate information (e.g., the doorbell is muted, an occupant of the house is asleep or does not wish to be disturbed, etc.).

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

FIG. 1 is an example of a communications system 100 in accordance with various aspects of the disclosure. In some embodiments, the communications system 100 may include one or more sensor units 110, local computing device 115, 120, network 125, server 155, control panel 135, and remote computing device 140. One or more sensor units 110 may communicate via wired or wireless communication links 145 with one or more of the local computing device 115, 120 or network 125. The network 125 may communicate via wired or wireless communication links 145 with the control panel 135 and the remote computing device 140 via server 155. In alternate embodiments, the network 125 may be integrated with any one of the local computing device 115, 120, server 155, or remote computing device 140, such that separate components are not required.

Local computing device 115, 120 and remote computing device 140 may be custom computing entities configured to interact with sensor units 110 via network 125, and in some embodiments, via server 155. In other embodiments, local computing device 115, 120 and remote computing device 140 may be general purpose computing entities such as a personal computing device, for example, a desktop computer, a laptop computer, a netbook, a tablet personal computer (PC), a control panel, an indicator panel, a multi-site dashboard, an iPod®, an iPad®, a smart phone, a mobile phone, a personal digital assistant (PDA), and/or any other suitable device operable to send and receive signals, store and retrieve data, and/or execute modules.

Control panel 135 may be a smart home system panel, for example, an interactive panel mounted on a wall in a user's home. Control panel 135 may be in direct communication via wired or wireless communication links 145 with the one or more sensor units 110, or may receive sensor data from the one or more sensor units 110 via local computing devices 115, 120 and network 125, or may receive data via remote computing device 140, server 155, and network 125.

The local computing devices 115, 120 may include memory, a processor, an output, a data input and a communication module. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some embodiments, the local computing devices 115, 120 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, receiving and displaying data from sensor units 110.

The processor of the local computing devices 115, 120 may be operable to control operation of the output of the local computing devices 115, 120. The output may be a television, a liquid crystal display (LCD) monitor, a cathode ray tube (CRT) monitor, speaker, tactile output device, and/or the like. In some embodiments, the output may be an integral component of the local computing devices 115, 120. Similarly stated, the output may be directly coupled to the processor. For example, the output may be the integral display of a tablet and/or smart phone. In some embodiments, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing devices 115, 120 to the output.

The remote computing device 140 may be a computing entity operable to enable a remote user to monitor the output of the sensor units 110. The remote computing device 140 may be functionally and/or structurally similar to the local computing devices 115, 120 and may be operable to receive data streams from and/or send signals to at least one of the sensor units 110 via the network 125. The network 125 may be the Internet, an intranet, a personal area network, a local area network (LAN), a wide area network (WAN), a virtual network, a telecommunications network implemented as a wired network and/or wireless network, etc. The remote computing device 140 may receive and/or send signals over the network 125 via communication links 145 and server 155.

In some embodiments, the one or more sensor units 110 may be sensors configured to conduct periodic or ongoing automated measurements related to detecting if an occupant is sleeping. Each sensor unit 110 may be capable of sensing multiple visual, aural, and/or vital sign parameters, or alternatively, separate sensor units 110 may monitor separate visual, aural, and/or vital sign parameters. For example, one sensor unit 110 may measure sound levels of a room, while another sensor unit 110 (or, in some embodiments, the same sensor unit 110) may detect motion in the room, and another sensor unit 110 (or again, in some embodiments, the same sensor unit 110) may detect vital signs of an occupant sleeping in the room.

Data gathered by the one or more sensor units 110 may be communicated to local computing device 115, 120, which may be, in some embodiments, a thermostat or other wall-mounted input/output smart home display. In other embodiments, local computing device 115, 120 may be a personal computer or smart phone. Where local computing device 115, 120 is a smart phone, the smart phone may have a dedicated application directed to collecting monitored data and calculating whether an occupant is sleeping therefrom. The local computing device 115, 120 may process the data received from the one or more sensor units 110 to obtain device adjustments when an occupant is sleeping. In alternate embodiments, remote computing device 140 may process the data received from the one or more sensor units 110, via network 125 and server 155, to obtain device adjustments when an occupant is sleeping. Data transmission may occur via, for example, frequencies appropriate for a personal area network (such as BLUETOOTH® or IR communications) or local or wide area network frequencies such as radio frequencies specified by the institute of electrical and electronics engineers (IEEE) 802.15.4 standard.

In some embodiments, local computing device 115, 120 may communicate with remote computing device 140 or control panel 135 via network 125 and server 155. Examples of networks 125 include cloud networks, LANs, wide area networks (WAN), virtual private networks (VPN), wireless networks (using 802.11, for example), and/or cellular networks (using 3G and/or LTE, for example), etc. In some configurations, the network 125 may include the Internet. In some embodiments, a user may access the functions of local computing device 115, 120 from remote computing device 140. For example, in some embodiments, remote computing device 140 may include a mobile application that interfaces with one or more functions of local computing device 115, 120.

The server 155 may be configured to communicate with the sensor units 110, the local computing devices 115, 120, the remote computing device 140 and control panel 135. The server 155 may perform additional processing on signals received from the sensor units 110 or local computing devices 115, 120, or may simply forward the received information to the remote computing device 140 and control panel 135.

Server 155 may be a computing device operable to receive data streams (e.g., from sensor units 110 and/or local computing device 115, 120 or remote computing device 140), store and/or process data, and/or transmit data and/or data summaries (e.g., to remote computing device 140). For example, server 155 may receive a stream of sensor data from a sensor unit 110, a stream of sensor data from the same or a different sensor unit 110, and a stream of sensor data from either the same or yet another sensor unit 110. In some embodiments, server 155 may "pull" the data streams, e.g., by querying the sensor units 110, the local computing devices 115, 120, and/or the control panel 135. In some embodiments, the data streams may be "pushed" from the sensor units 110 and/or the local computing devices 115, 120 to the server 155. For example, the sensor units 110 and/or the local computing device 115, 120 may be configured to transmit data as it is generated by or entered into that device. In some instances, the sensor units 110 and/or the local computing devices 115, 120 may periodically transmit data (e.g., as a block of data or as one or more data points).

In some cases, the control panel 135 in communication with the sensor units 110 may receive sensor data associated with at least one sensor of a home automation system. In some examples, the control panel 135 may receive a trigger to perform a security function associated with a home automation system. In some examples, the security function may be instructions to arm or disarm a property (i.e., activate alarm parameters). After receiving the instructions, the control panel 135 may determine one or more settings associated with the security and automation system 100. In some examples, the security and/or automation system 100 may be referred to as a home automation system.

The server 155 may include a database (e.g., in memory) containing sensor data received from the sensor units 110 and/or the local computing devices 115, 120. Additionally, as described in further detail herein, software (e.g., stored in memory) may be executed on a processor of the server 155. Such software (executed on the processor) may be operable to cause the server 155 to monitor, process, summarize, present, and/or send a signal associated with resource usage data.

As described herein, the sensor units 110 in combination with the control panel 135 may determine that the security and/or automation system is operating in a first mode (such as, a do-not-disturb mode), and may modify an audio setting of the security and/or automation system based on determining that the security and/or automation system is operating in the first mode. In some cases, the sensor units 110 may detect an interaction with a doorbell of the premises and may mute a sound of the doorbell based on detecting the interaction with the doorbell and the modified audio setting.

Figure 2:
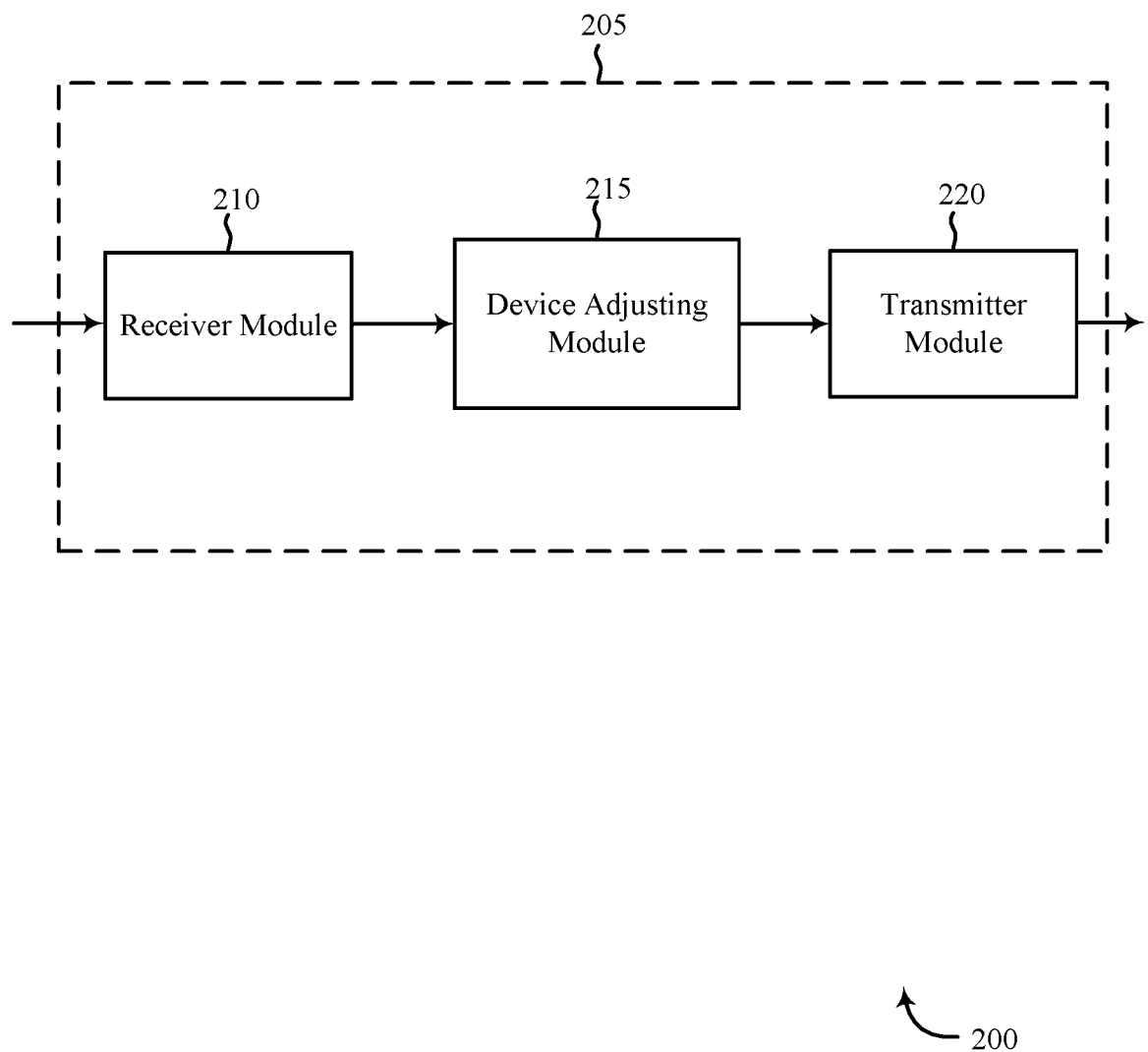
FIG. 2 shows a block diagram of a device relating to a security and/or an automation system, in accordance with various aspects of this disclosure.

FIG. 2 shows a block diagram 200 of a device for use in electronic communication in accordance with various aspects of this disclosure. For example, the block diagram 200 may illustrate an example of one or more aspects of a control panel 205, although aspects of the block diagram 200 may additionally or alternatively be implemented by one or more aspects of other devices (e.g., the server 155, local computing devices 115, 120, the remote computing device 140, etc.). The control panel 205 may be an example of one or more aspects of a control panel 135 described with reference to FIG. 1. The control panel 205 may include a receiver module 210, a device adjusting module 215, and/or a transmitter module 220. The control panel 205 may also be or include a processor. Each of these modules may be in communication with each other—directly and/or indirectly.

The components of the control panel 205 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented—in whole or in part—with instructions embodied in memory formatted to be executed by one or more general and/or application-specific processors.

The receiver module 210 may receive information such as packets, user data, and/or control information associated with various information channels (e.g., control channels, data channels, etc.). The receiver module 210 may be configured to receive monitored sensor data such as any combination of monitored motion sensor data, monitored camera data, monitored sound level data, monitored vital sign data, etc. Information may be passed on to the device adjusting module 215, and to other components of the control panel 205 for analysis.

Device adjusting module 215 may monitor sensor data from one or more sensors. Device adjusting module 215 may receive data from the sensors such as any combination of monitored motion sensor data, monitored camera data, monitored sound data, monitored vital sign data, etc., and process the received data to detect an occupant sleeping. Upon detecting the occupant sleeping, device adjusting module 215 may modify one or more settings associated with one or more devices of a home automation system. In some cases, device adjusting module 215 may modify at least one of an audio setting associated with the home automation system, a thermostat setting associated with the home automation system, a sensor setting associated with the home automation system, an appliance setting associated with the home automation system, and a security setting associated with the home automation system, or any combination thereof.

Additionally or alternatively, the device adjusting module 215 may determine that the security and/or automation system is operating in a first mode. Device adjusting module may modify an audio setting of the security and/or automation system based on determining that the security and/or automation system is operating in the first mode. Device adjusting module 215 may detect an interaction with a doorbell of the premises associated with the security and/or automation system. In some cases, device adjusting module 215 may mute a sound of the doorbell based on detecting the interaction with the doorbell and the modified audio setting. The device adjusting module 215 may provide, in response to muting the sound of the doorbell, a message at the doorbell indicating that the sound of the doorbell is muted. In some examples, the device adjusting module 215 may detect a second interaction with the doorbell based on providing the message. In such examples, the device adjusting module 215 may emit the sound of the doorbell based on detecting the second interaction with the doorbell.

The transmitter module 220 may transmit the one or more signals received from other components of the control panel 205. The transmitter module 220 may transmit notifications related to adjusting devices while an occupant is asleep and/or any combination of monitored sensor data. In some examples, the transmitter module 220 may be collocated with the receiver module 210 in a transceiver module.

Figure 3:
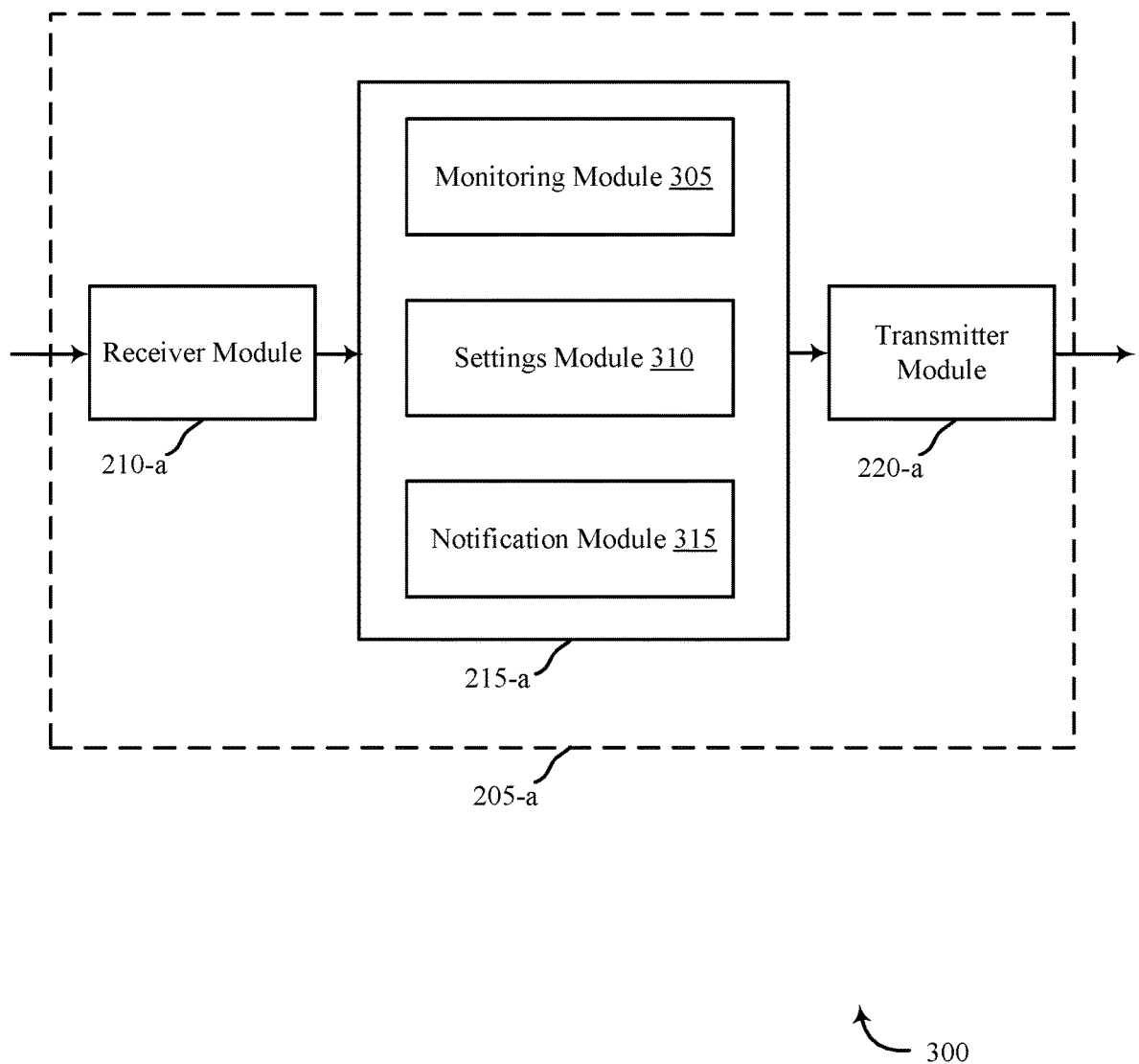
FIG. 3 shows a block diagram of a device relating to a security and/or an automation system, in accordance with various aspects of this disclosure.

FIG. 3 shows a block diagram 300 of a control panel 205-a for use in wireless communication, in accordance with various examples. The control panel 205-a may be an example of one or more aspects of a control panel 135 described with reference to FIG. 1. It may also be an example of a control panel 205 described with reference to FIG. 2. The control panel 205-a may include a receiver module 210-a, a device adjusting module 215-a, and/or a transmitter module 220-a, which may be examples of the corresponding modules of control panel 205. The control panel 205-a may also include a processor. Each of these components may be in communication with each other. The device adjusting module 215-a may include monitoring module 305, settings module 310, and notification module 315. The receiver module 210-a and the transmitter module 220-a may perform the functions of the receiver module 210 and the transmitter module 220, of FIG. 2, respectively.

The components of the control panel 205-a may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented—in whole or in part—with instructions embodied in memory formatted to be executed by one or more general and/or application-specific processors.

In one embodiment, monitoring module 305 may monitor sensor data from one or more sensors. For example, monitoring module 305 may monitor a motion sensor, a video sensor, a light sensor, a temperature sensor, a sound sensor, a vital signs sensor, or a combination thereof. In some embodiments, monitoring module may detect an occupant sleeping, based on the monitored sensor data. For example, monitoring module 305 may detect that an occupant is sleeping based on the vital signs sensor. In some examples, monitoring module 305 may detect that the motion sensor has not detected any movement for a predetermined time, but the vital signs sensor detects heartbeat. Based on the combination of both sensors, monitoring module may determine that a home is occupied and an occupant is asleep. Upon detecting the occupant sleeping, settings module 310 may modify one or more settings associated with one or more devices of a home automation system.

In some embodiments, monitoring module 305 may detect a doorbell at the home being rung. For example, monitoring module 305 may identify a chime of a doorbell, or a camera may detect a visitor at the front porch, and may capture the visitor ringing the doorbell. In some embodiments, monitoring module 305 may detect a knock on the front door, instead of the doorbell being rung. In some embodiments, monitoring module 305 may detect an interaction with a doorbell of the premises associated with the home automation system (e.g., a security and/or automation system). For example, an individual (e.g., a visitor, a guest, a solicitor, emergency personnel, etc.) may activate a doorbell function of the home automation system, for example, by pressing a doorbell button. The monitoring module 305 may detect the activated doorbell function.

In some embodiments, monitoring module 305 may identify a room where an occupant is sleeping. In some cases, monitoring module 305 may identify a room when a baby is sleeping based on an output of a baby monitor situated in the room. In some cases, monitoring module 305 may detect that an occupant is sleeping based on identifying a scheduled nap time set for a predetermined period of time, identifying a voice command to initiate the nap time, or determining that the occupant has activated a nap time profile from a home security and/or automation application. In some cases, monitoring module 305 may detect an occupant in a bedroom lying down and remaining still for a predetermined amount of time. In some cases, monitoring module may detect a sound machine being activated, and monitor a vital sign of the occupant that includes at least one of pulse, heart rate, breathing, breathing rate. In such cases, monitoring module 305 may determine that an occupant is sleeping based on the monitored vital sign. In some examples, monitoring module 305 may identify a room where an occupant is sleeping by visually detecting via a camera at the premises that an occupant is lying down in a particular room. In some cases, monitoring module 305 may detect that the occupant is remaining still for a predetermined amount of time, and based on the detection, monitoring module 305 may identify that at least one occupant of a home is sleeping. In some examples, the predetermined amount of time may be received from an occupant profile. In some examples, the predetermined amount of time may be determined by the home security and/or automation system.

In some examples, monitoring module 305 may identify a pattern associated with a nap time of an occupant. For example, monitoring module 305 may identify that user A usually takes a nap every afternoon. Based on the identified pattern, monitoring module 305 may detect that an occupant is sleeping. In some examples, monitoring module 305 may receiving a voice command such as "System, initiate nap time for the nursery."

In some embodiments, monitoring module 305 may identify a presence of a second occupant in the home. In some cases, monitoring module 305 may identify that an occupant is napping and a doorbell has been rung. Upon detecting the doorbell being rung, monitoring module 305 may determine if there is a second occupant present at the home. For example, monitoring module 305 may identify that the second occupant is not asleep. In some cases, monitoring module 305 may identify the person present at the home. For example, monitoring module 305 may identify whether the second occupant is a child or not.

Upon detecting that at least one occupant of a home is asleep, settings module 310 may modify one or more settings associated with one or more devices of a home automation system. In some cases, settings module 310 may modify an audio setting associated with the home automation system. For example, settings module 310 may adjust volume of a chime of a doorbell associated with the home automation system, mute the chime of the doorbell, bypassing the chime of the doorbell, modify the chime of the doorbell from a first type of chime to a second type of chime, mute one or more speakers located within the home, and/or activate a sound machine near a location of the occupant. In some examples, upon detecting an occupant is sleeping, settings module 310 may mute one or more speakers relative to a room where the occupant is sleeping for a duration until the home automation system detects that the occupant is awake. For example, upon determining an occupant is taking a nap on a couch in the family room, settings module 310 may mute a speaker of the home automation system in the family room. In some cases, settings module 310 may mute one or more speakers that are in locations adjacent to the family room. Thus, settings module 310 may be configured to adjust the volumes of several speakers in the premises based on where the occupant is sleeping. In some cases, settings module 310 may determine that an occupant has fallen asleep while watching the television. Upon detecting the occupant sleeping, settings module 310 may mute the television. In some cases, settings module 310 may mute a dedicated doorbell chime based on where the occupant is sleeping. For example, if the doorbell chime is located on a first floor and the occupant is sleeping on a second floor of the premises, settings module 310 may allow the doorbell chime to play sound while the occupant is sleeping. In some cases, settings module 310 may reduce a volume of the doorbell chime upon detecting that at least one occupant is sleeping.

In some embodiments, the settings module 310 may determine that the home automation system is operating in one or more modes, such as a do-not-disturb mode. For example, an occupant may wish not to be disturbed and the occupant may provide input (e.g., via a device such as the control panel 205-a) setting the mode of the system to a do-not-disturb mode. Additionally or alternatively, the settings module 310 may determine to operate in one or more modes based on pre-configured settings. For example, the settings module 310 may identify one or more thresholds, compare sensor data to the thresholds, and operate in a do-not-disturb mode based on the comparison. According to one or more examples, the settings module 310 may determine that the security and/or automation system is operating in a first mode. In some cases, the settings module 310 may receive an input from an individual associated with the security and/or automation system, where determining that the security and/or automation system is operating in the first mode is based on the received input. Additionally or alternatively, the settings module 310 may identify one or more settings associated with the security and/or automation system, where determining that the security and/or automation system is operating in the first mode is based on the one or more settings. In some cases, the one or more settings may include at least one of a do-not-disturb time period, a noise threshold, an occupancy of the premises, or any combination thereof. As an illustrative example, the settings module 310 may be configured with a do-not-disturb time period (e.g., a range of time such as hours, days, weeks, etc.), a noise threshold (e.g., a quantity of noise in the home may be relatively low, for example, if one or more occupants are asleep), an occupancy threshold (e.g., the settings module 310 may identify whether one or more occupants are at the premises), among other examples of thresholds. The settings module 310 may compare the thresholds to sensor data or other information and operate in the do-not-disturb mode if one or more of the thresholds are satisfied. For example, the settings module 310 may determine that the occupants are not at the premises, that one or more occupants are asleep, that a visitor is interacting with the doorbell during the do-not-disturb time period, etc., and the settings module 310 may operate in a do-not-disturb mode based on the determination.

According to one or more examples, the monitoring module 305 may monitor sensor data from one or more sensors associated with the security and/or automation system. The monitoring module 305 may detect an occupant sleeping based on the monitored sensor data, where determining that the security and/or automation system is operating in the first mode is based on detecting the occupant sleeping.

In some embodiments, the settings module 310 may modify an audio setting of the security and/or automation system based on determining that the security and/or automation system is operating in the first mode, For example, the settings module 310 may modify one or more audio setting of the home automation system as described herein, for example, based on determining that the security and/or automation system is operating in the do-not-disturb mode. Additionally or alternatively, the monitoring module 305 may detect an interaction with a doorbell of the premises associated with the security and/or automation system and the settings module 310 may mute a sound of the doorbell based on detecting the interaction with the doorbell and the modified audio setting. In some embodiments, settings module 310 may modify a thermostat setting associated with the home automation system, upon detecting an occupant sleeping. In some cases, settings module 310 may adjust a temperature of the home based on a location where the occupant is sleeping. For example, if settings module 310 determines that the occupant is sleeping in the second floor of a home, then settings module 310 may set the temperatures of the first floor and the second floor differently. In some cases, settings module 310 may retrieve an occupant preferences profile. For example, the occupant may create a profile with the home security and/or automation system, and settings module 310 may retrieve the occupant profile upon detecting the occupant sleeping. In some cases, the occupant profile may include occupant preferences relating to multiple sensors in the premises. In some examples, settings module 310 may identify a predefined room temperature from the occupant preferences profile. In some embodiments, upon detecting an occupant is sleeping, settings module 310 may adjust the thermostat to the predefined room temperature.

In some embodiments, settings module 310 may link a room of a premises with a particular occupant of the premises (e.g., linked to occupant's name, to occupant's face via facial recognition, linked to occupant's voice via voice recognition, etc.). For example, settings module 310 may link an occupant's name to the master bedroom. In some embodiments, settings module 310 may link one or more devices in the occupant's room with the occupant. For example, settings module 310 may link any combination of one or more sensors, speakers, climate control devices (e.g., heaters, etc.), and other devices in the room to the particular occupant. In one example, settings module 310 may relate a baby's name with a baby's room. Thus, when an occupant of the premises states, "I'm putting the baby down for a nap," settings module 310 may receive the voice prompt and process it to determine one or more devices linked to the baby's room, such as a sound machine in the baby's room, a space heater in the baby's room, one or more sensors such as motion sensors, camera sensors, decibel meters, etc. Thus, upon being notified that the baby has been put down for a nap, settings module 310 may activate one or more of the devices in the baby's room for a predetermined amount of time. In some cases, settings module 310 may visually confirm that the baby is placed down for a nap in a room based on one or more sensors in or located at or near the room. For example, a motion detector inside the room and/or with a view of the entrance to the room may indicate motion of an occupant entering the room. In some cases, settings module may deactivate one or more devices in the baby's room, upon detecting that the baby is awake after the nap.

In one embodiment, settings module 310 may modify a sensor setting associated with the home automation system, upon detecting an occupant sleeping. In some cases, settings module 310 may adjust one or more light sensors to an ambient light setting, activate one or more motion sensors within the home, adjust a humidity sensor, and/or adjust a threshold of a proximity sensor. In some cases, settings module 310 may modify an appliance setting associated with the home automation system, and a security setting associated with the home automation system. For example, settings module 310 may delay a dryer to reduce the sound within the premises. In some examples, upon detecting the occupant sleeping, settings module 310 may play a sound in the room where an occupant is sleeping. In some cases, the sound played may include at least one of white noise and one or more sounds of nature such as ocean sounds, river sounds, rain sounds, wind sounds, bird sounds, etc. In some configurations, a camera in the room may include one or more speakers. Thus, in some cases, the sound may be played through the camera. In some embodiments, an occupant may start a sound machine and monitoring module 305 may detect the sound machine being played. In some cases, a camera with a microphone and/or another device with a microphone in the same room as the sound machine may detect the sound machine. Upon detecting the sound, via monitoring module 305, settings module 310 may detect that an occupant is about to sleep. In some embodiments, settings module 310 may determine in what room the sound machine is being played and customize sensor settings for the detected room. Thus, when a doorbell is run, a chime sound may not be heard in the room where the occupant is sleeping.

In some embodiments, upon detecting the occupant is sleeping, settings module 310 may activate a heart monitoring and/or breathing rate of the sleeping occupant. In some cases, monitoring module 305 may monitor heart and/or breathing rates of an occupant to determine whether the occupant is falling asleep or taking a nap. In some examples, monitoring module 305 may be configured to detect any of audio, video, light, physiological (including heart rate, respiration rate, posture, sleep status, identity, etc.), and/or movement (including occupancy and location) data (among other things) associated with the occupant to detect when the occupant is sleeping. In some embodiments, monitoring module 305 may monitor heart and/or breathing rates to enable settings module 310 to determine whether the monitored rates indicate the occupant is waking up or is awake following a nap.

In some embodiments, settings module 310 may activate a motion sensor in the room where an occupant is sleeping. In some cases, settings module 310 may activate the motion sensor upon detecting the occupant sleeping. In some cases, monitoring module 305 may locate the occupant sleeping in the room. In some embodiments, monitoring module 305 may monitor the room where the occupant is sleeping for detectable motion. Upon detecting motion via monitoring module 305, settings module 310 may analyze the motion to determine whether detected motion indicates the occupant is awake. For example, settings module 310 may analyze the motion to determine whether the motion is an isolated movement of one still taking a nap such as a motion of turning from napping on one's side to one's back, etc., or whether the motion indicates the occupant has moved from a sleeping position to a sitting up or standing position. In some examples, upon detecting an occupant sleeping, settings module 310 may mute a speaker in the room where the occupant is sleeping.

In some cases, upon detecting the occupant sleeping, settings module 310 may activate a decibel meter in the room where an occupant is sleeping. In some examples, settings module 310 may adjust one or more lights in the room where the occupant is sleeping. In some embodiments, monitoring module 305 may monitor an ambient light level in the room where the occupant is sleeping. In some embodiments, monitoring module 305 may monitor an ambient noise level relative to the room where the occupant is sleeping. Upon detecting, via monitoring module 305, that the noise level exceeds a predetermined threshold, settings module 310 may adjust an aspect of a sound being played in the room to decrease the noise level below the predetermined threshold. In some cases, settings module 310 may mask the detected noise. In some examples, settings module 310 may increase the volume of the sound being played in the room, play more than one sound such as rain and ocean sounds, etc.

In some embodiments, settings module 310 may detect that the occupant is awake after a nap. Upon determining the occupant is awake after a nap, settings module 310 may restore an audio setting associated with the home automation system to a default mode, a thermostat setting associated with the home automation system to the default mode, a sensor setting associated with the home automation system to the default mode, an appliance setting associated with the home automation system to the default mode, or a security setting associated with the home automation system to the default mode. In some cases, settings module 310 may turn off the sound machine in the room where the occupant is sleeping.

In some configurations, settings module 310 may route a doorbell notification to an alternative destination. In some cases, the doorbell notification includes any combination of a sound played on a mobile device, a notification displayed on a home automation application, a message displayed on the mobile device, a message displayed on a television screen, a message displayed on a control panel of the home automation system, and flashing a light of a sensor of the home automation system (e.g., flashing a light on a motion sensor or other type of sensor), and flashing a security or strobe light of the home automation system. In some cases, a pattern may be flashed on a light. For example, four a security light of the premises may be flashed 4 times to indicate the doorbell is being pressed.

In some embodiments, if monitoring module 305 detects that there is a non-napping occupant present in the house, then notification module 315 may provide a doorbell notification to the non-napping occupant of the home based on detecting the occupant napping. In some embodiments, a non-napping first occupant may query the system for updates regarding a napping second occupant. For example, the first occupant may ask "System, is the baby still napping?" In response, settings module 310 may determine whether the second occupant is napping in conjunction with monitoring module 305 monitoring the sound, motion, heart/breathing rates, etc., of the second occupant. The system may generate a response indicating whether the second occupant appears to be sleeping.

In one embodiment, upon determining the occupant is awake after a nap, notification module 315 may generate a notification indicating the occupant is awake. The notification may include information regarding the nap such as length of nap, heart/breathing rate during the nap, calories burnt during the nap, motion and/or sounds detected during nap, operation of devices during the nap, confirmation of devices being deactivated at the conclusion of nap time, etc. In some cases, upon determining the occupant is awake, settings module 310 may restore one or more sensor settings in the home. In some cases, the notification may include a prompt that requests the recipient to confirm that the sensor settings are being restored.

In some embodiments, notification module 315 may provide a message. For example, the notification module 315 may provide a message in response to a detected interaction at a doorbell and/or based on muting the sound of the doorbell (e.g., in accordance with a do-not-disturb mode). In some examples, the message may include an audio message, a display message, an indication that an occupant of the premises is sleeping, an indication that the security and/or automation system is operating in the first mode, a query of an identity of a person interacting with the doorbell, a query of an intent of the person interacting with the doorbell, an instruction to interact with the doorbell, or any combination thereof. In some cases, the message may indicate to interact with the doorbell a second time if one or more conditions are satisfied. As an illustrative example, the message may instruct a visitor at the doorbell to press the doorbell a second time if they are not a solicitor, if there is an emergency, etc. Additionally or alternatively, the message may indicate information (e.g., information that the doorbell is muted, information that an occupant of the house is asleep or does not wish to be disturbed, etc.). In some examples, the monitoring module 305 may detect a second interaction at the doorbell based on providing the message. For example, after the message is provided to an individual proximate the doorbell, the individual may ring the doorbell again (e.g., the message may indicate that the doorbell chime was muted or redirected and the message may prompt the individual to ring again if the one or more conditions are satisfied). In such examples, the settings module 310 may modify an audio setting based on the second interaction in response to the message (e.g., the settings module 310 may enable a sound, such as a chime, of the doorbell upon the second activation of the doorbell). In some examples, the settings module 310 may emit the sound of the doorbell based on detecting the second interaction with the doorbell. In some examples, the settings module 310 may determine that the security and/or automation system is operating in a second mode and the monitoring module 305 may detect a second interaction with the doorbell of the premises associated with the security and/or automation system. In some examples, the settings module 310 may refrain from muting a second sound of the doorbell based on determining that the security and/or automation system is operating in the second mode.

In some examples, the monitoring module 305 may determine a doorbell notification based on detecting the interaction with the doorbell. In some examples, the settings module 310 may route the doorbell notification to an alternative destination based on muting the sound of the doorbell. The doorbell notification may include at least one of a sound emitted from a mobile device, a notification displayed on a home automation application, a message displayed on the mobile device, a message displayed on a television screen, a message displayed on a control panel of the security and/or automation system, and flashing a light of a sensor of the security and/or automation system, or any combination thereof. Thus, the system may realize one or more potential advantages, such as enabling an occupant to be notified of a doorbell interaction during a do-not-disturb mode if one or more conditions are satisfied.

Figure 4:
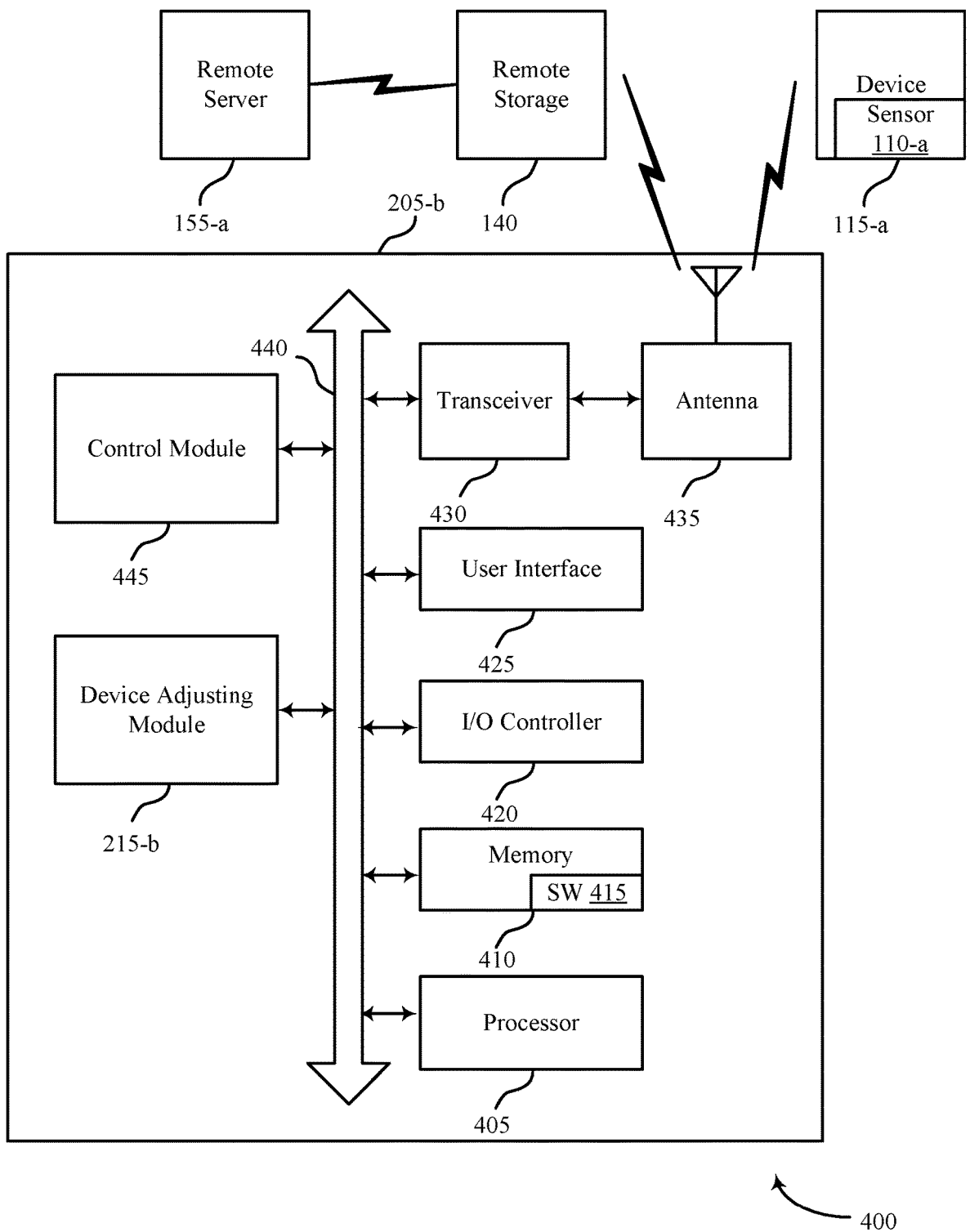
FIG. 4 shows a block diagram relating to a security and/or an automation system, in accordance with various aspects of this disclosure.

FIG. 4 shows a system 400 for use in security and/or automation systems, in accordance with various examples. System 400 may include a control panel 205-b, which may be an example of the control panels 135 of FIG. 1. Control panel 205-b may also be an example of one or more aspects of control panels 205 and/or 205-a of FIGS. 2 and 3. Control panel 205-b may include control module 445, which may be an example of settings module 310 described with reference to FIG. 2. In some embodiments, the terms a control panel and a control device are used synonymously.

Control panel 205-b may also include components for bi-directional voice and data communications including components for transmitting communications and components for receiving communications. For example, control panel 205-b may communicate bi-directionally with one or more of device 115-a, one or more sensors 110-a, remote storage 140, and/or remote server 155-a, which may be an example of the remote server of FIG. 1. This bi-directional communication may be direct (e.g., control panel 205-b communicating directly with remote storage 140) or indirect (e.g., control panel 205-b communicating indirectly with remote server 155-a through remote storage 140). Sensors 110-a may be examples of sensors 110 of FIG. 1.

The control module 445 may control the operation of devices in a premises based on detecting an occupant sleeping as described above with reference to FIGS. 1-3. For example, control module 445 may activate a space heater and/or a sound machine in a room of the premises where an occupant is taking a nap. In some other examples, control module 445 may adjust a thermostat in a room where the occupant is sleeping.

Control panel 205-b may also include a processor module 405, and memory 410 (including software/firmware code 415), an input/output controller module 420, a user interface module 425, a transceiver module 430, and one or more antennas 435 each of which may communicate—directly or indirectly—with one another (e.g., via one or more buses 440). The transceiver module 430 may communicate bi-directionally—via the one or more antennas 435, wired links, and/or wireless links—with one or more networks or remote devices as described above. For example, the transceiver module 430 may communicate bi-directionally with one or more of device 115-a, remote storage 140, and/or remote server 155-a. The transceiver module 430 may include a modem to modulate the packets and provide the modulated packets to the one or more antennas 435 for transmission, and to demodulate packets received from the one or more antenna 435. While a control panel or a control device (e.g., 205-b) may include a single antenna 435, the control panel or the control device may also have multiple antennas 435 capable of concurrently transmitting or receiving multiple wired and/or wireless transmissions. In some embodiments, one element of control panel 205-b (e.g., one or more antennas 435, transceiver module 430, etc.) may provide a direct connection to a remote server 155-a via a direct network link to the Internet via a POP (point of presence). In some embodiments, one element of control panel 205-b (e.g., one or more antennas 435, transceiver module 430, etc.) may provide a connection using wireless techniques, including digital cellular telephone connection, Cellular Digital Packet Data (CDPD) connection, digital satellite data connection, and/or another connection.

The signals associated with system 400 may include wireless communication signals such as radio frequency, electromagnetics, LAN, wide area network (WAN), virtual private network (VPN), wireless network (using 802.11, for example), 345 MHz, Z-WAVE®, cellular network (using 3G and/or LTE, for example), and/or other signals. The one or more antennas 435 and/or transceiver module 430 may include or be related to, but are not limited to, wireless WAN (WWAN) (e.g., GSM, CDMA, and WCDMA), wireless LAN (WLAN) (e.g., including BLUETOOTH® and Wi-Fi), wireless metropolitan area network (WMAN) (e.g., WiMAX), antennas for mobile communications, antennas for Wireless Personal Area Network (WPAN) applications (including radio-frequency identification (RFID) and UWB). In some embodiments, each antenna 435 may receive signals or information specific and/or exclusive to itself. In other embodiments, each antenna 435 may receive signals or information not specific or exclusive to itself.

In some embodiments, one or more sensors 110-a (e.g., motion, proximity, smoke, light, glass break, door, window, carbon monoxide, and/or another sensor) may connect to some element of system 400 via a network using one or more wired and/or wireless connections.

In some embodiments, the user interface module 425 may include an audio device, such as an external speaker system, an external display device such as a display screen, and/or an input device (e.g., remote control device interfaced with the user interface module 425 directly and/or through I/O controller module 420).

One or more buses 440 may allow data communication between one or more elements of control panel 205-b (e.g., processor module 405, memory 410, I/O controller module 420, user interface module 425, etc.).

The memory 410 may include random access memory (RAM), read only memory (ROM), flash RAM, and/or other types. The memory 410 may store computer-readable, computer-executable software/firmware code 415 including instructions that, when executed, cause the processor module 405 to perform various functions described in this disclosure (e.g., detecting an occupant sleeping, adjusting sensors in the home while the occupant is sleeping, monitoring one or more aspects of the home, adjusting one or more aspects of a security/automation system after the occupant is awake, etc.). Alternatively, the software/firmware code 415 may not be directly executable by the processor module 405 but may cause a computer (e.g., when compiled and executed) to perform functions described herein. Alternatively, the computer-readable, computer-executable software/firmware code 415 may not be directly executable by the processor module 405 but may be configured to cause a computer (e.g., when compiled and executed) to perform functions described herein. The processor module 405 may include an intelligent hardware device, e.g., a central processing unit (CPU), a microcontroller, an ASIC, etc.

In some embodiments, the memory 410 can contain, among other things, the Basic Input-Output system (BIOS) which may control basic hardware and/or software operation such as the interaction with peripheral components or devices. For example, the control module 445 and/or device adjusting module 215-b to implement the present systems and methods may be stored within the system memory 410. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver module 430, one or more antennas 435, etc.).

Many other devices and/or subsystems may be connected to one or may be included as one or more elements of system 400 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of system memory 410 or other memory. The operating system provided on I/O controller module 420 may be iOS®, ANDROID®, MS-DOS®, MS-WINDOWS®, OS/2®, UNIX®, LINUX®, or another known operating system.

The transceiver module 430 may include a modem configured to modulate the packets and provide the modulated packets to the antennas 435 for transmission and/or to demodulate packets received from the antennas 435. While the control panel or control device (e.g., 205-b) may include a single antenna 435, the control panel or control device (e.g., 205-b) may have multiple antennas 435 capable of concurrently transmitting and/or receiving multiple wireless transmissions.

The control panel 205-b may include a device adjusting module 215-b, which may perform the functions described above for the device adjusting modules 215 of control panel 205 of FIGS. 2 and/or 3.

Figure 5:
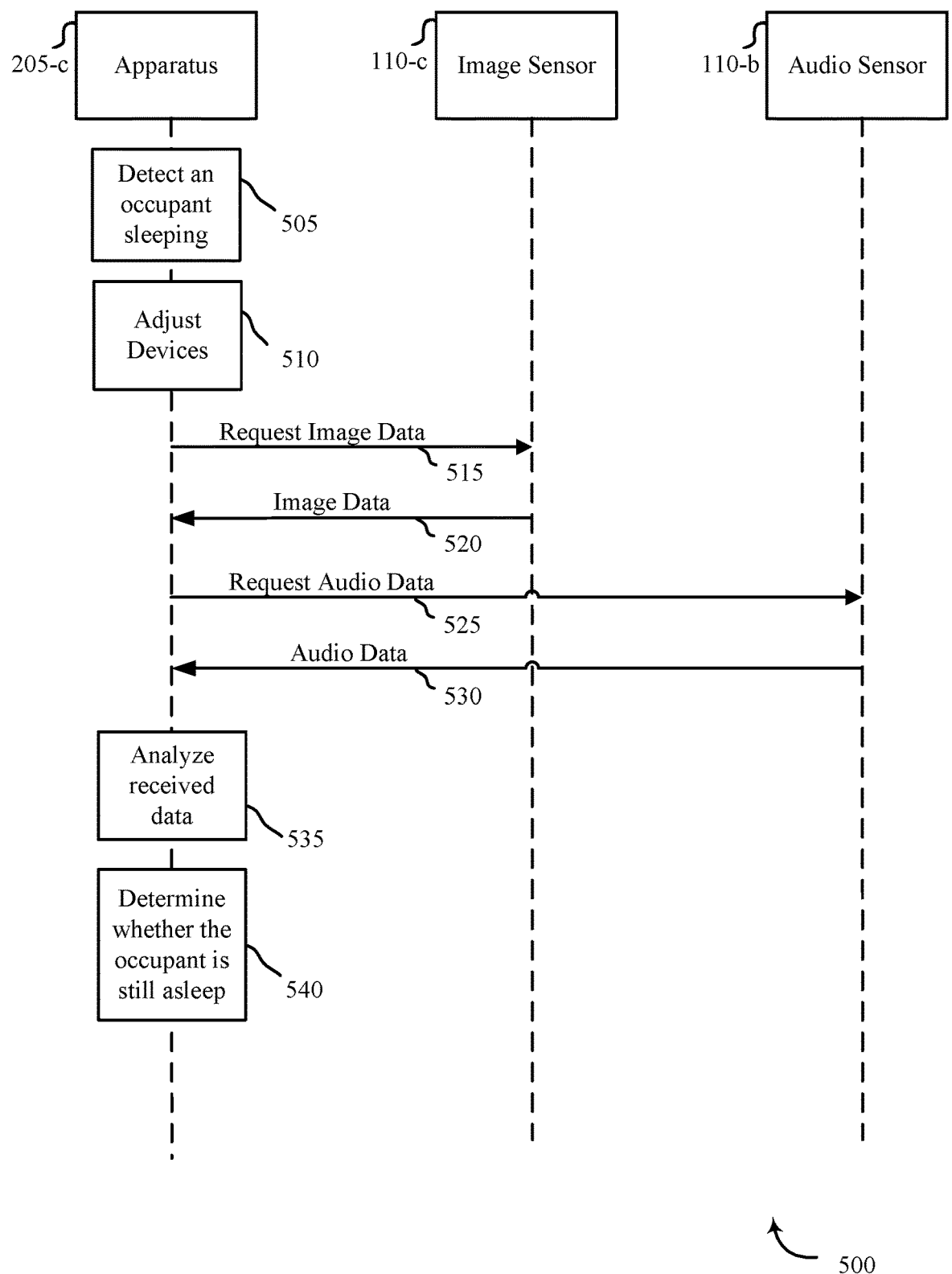
FIG. 5 shows a block diagram of a flow of operations relating to a security and/or an automation system, in accordance with various aspects of this disclosure.

FIG. 5 shows a block diagram of a data flow 500 relating to a security and/or an automation system, in accordance with various aspects of this disclosure. The data flow 500 illustrates the flow of data between an audio sensor 110-b, an image sensor 110-c, and an apparatus 205-c. The audio and/or image sensors 110 may be examples of one or more aspects of sensor 110 from FIGS. 1 and/or 4. Apparatus 205-c may be an example of one or more aspects of control panel 135 of FIG. 1, and/or apparatus 205 of FIGS. 2-4. In some cases, apparatus 205-c may include a computing device such as a smart phone, desktop, laptop, remote server (e.g., server 155 of FIG. 1). In some cases, apparatus 205-c may include a storage device and/or database.

At block 505, apparatus 205-c may detect an occupant sleeping. In some cases, apparatus 205-c may detect that the occupant is asleep, in conjunction with audio sensor 110-b and/or image sensor 110-c. For example, in one example, audio sensor 110-b may detect a sound machine being played and/or receive an audio command to initiate nap time for the occupant. In some examples, image sensor 110-c may capture an image of the occupant lying on a bed, and thus the apparatus 205-c may detect that the occupant is sleeping. At block 510, upon detecting the occupant sleeping, apparatus 205-c may adjust devices in the home where the occupant is sleeping. For example, apparatus 205-c may modify at least one of an audio setting, a thermostat setting, a sensor setting, an appliance setting, and a security setting.

In some embodiments, apparatus 205-c may request image data 515 from the image sensor 110-c. In one embodiment, image sensor 110-c may send an image data stream 520 to apparatus 205-c. Apparatus 205-c may analyze the image data stream 520 to determine whether an occupant is still sleeping, or whether the occupant has woken up. In some embodiments, apparatus 205-c may send a request 525 for audio data. In response, audio sensor 110-b may send audio data stream 530 to apparatus 205-c. For example, audio sensor 110-b may measure an ambient sound level associated with a room where the occupant sleeps and send data related to the measured sound to apparatus 205-c.

At block 535, apparatus 205-c may analyze the received data, which may include image data stream 520 and/or audio data stream 530. Based on the analysis of the received data, at block 540, apparatus 205-c may determine whether to continue with the adjusted device settings or whether to restore the device settings upon determining the received data indicates the occupant is no longer sleeping.

Figure 6:
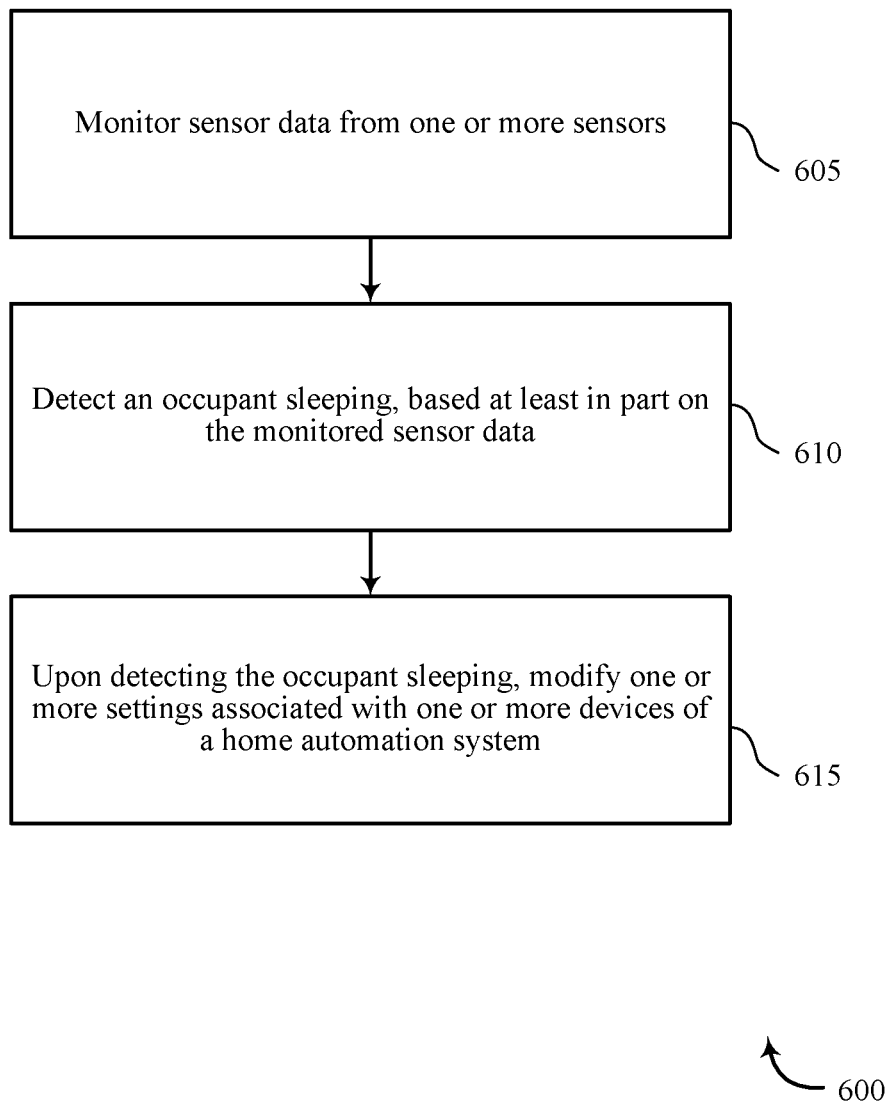
FIG. 6 is a flow chart illustrating an example of a method relating to a security and/or an automation system, in accordance with various aspects of this disclosure.

FIG. 6 is a flow chart illustrating an example of a method 600 for adjusting devices upon detecting occupant is asleep, in accordance with various aspects of the present disclosure. For clarity, the method 600 is described below with reference to aspects of one or more of the sensors 110 described with reference to FIGS. 1, 4, and/or 5. In some examples, a control panel, backend server, and/or one or more sensors may execute one or more sets of codes to control the functional elements of the security/automation system to perform the functions described below. Additionally or alternatively, the control panel, backend server, and/or one or more sensors may perform one or more of the functions described below using special-purpose hardware.

At block 605, the method 600 may include monitoring sensor data from one or more sensors. At block 610, the method 600 may include detecting an occupant sleeping, based on the monitored sensor data. In some cases, the method 600 may monitor a camera to detect if an occupant is lying down, and may detect the occupant sleeping based on the image data received from the camera. At block 615, upon detecting the occupant sleeping, the method 600 may include modifying one or more settings associated with one or more devices of a home automation system. In some cases, modifying the one or more settings may include modifying an audio setting of a dedicated chime connected to a doorbell at a premises associated with the home automation system. For example, modifying the audio setting associated with the home automation system includes a combination of adjusting volume of a chime of a doorbell, muting the chime of the doorbell, bypassing the chime of the doorbell, modifying the chime of the doorbell from a first type of chime to a second type of chime, muting one or more speakers located within the home, and activating a sound machine near a location of the occupant. In some examples, modifying one or more settings includes modifying a combination of a thermostat setting associated with the home automation system, a sensor setting associated with the home automation system, and an appliance setting associated with the home automation system, and a security setting associated with the home automation system.

The operation(s) of method 600 may be performed using the device adjusting module 215 described with reference to FIGS. 2, 3, and/or 4. Thus, the method 600 may provide for adjusting devices upon detecting an occupant is asleep relating to automation/security systems. It should be noted that the method 600 is just one implementation and that the operations of the method 600 may be rearranged or otherwise modified such that other implementations are possible.

Figure 7:
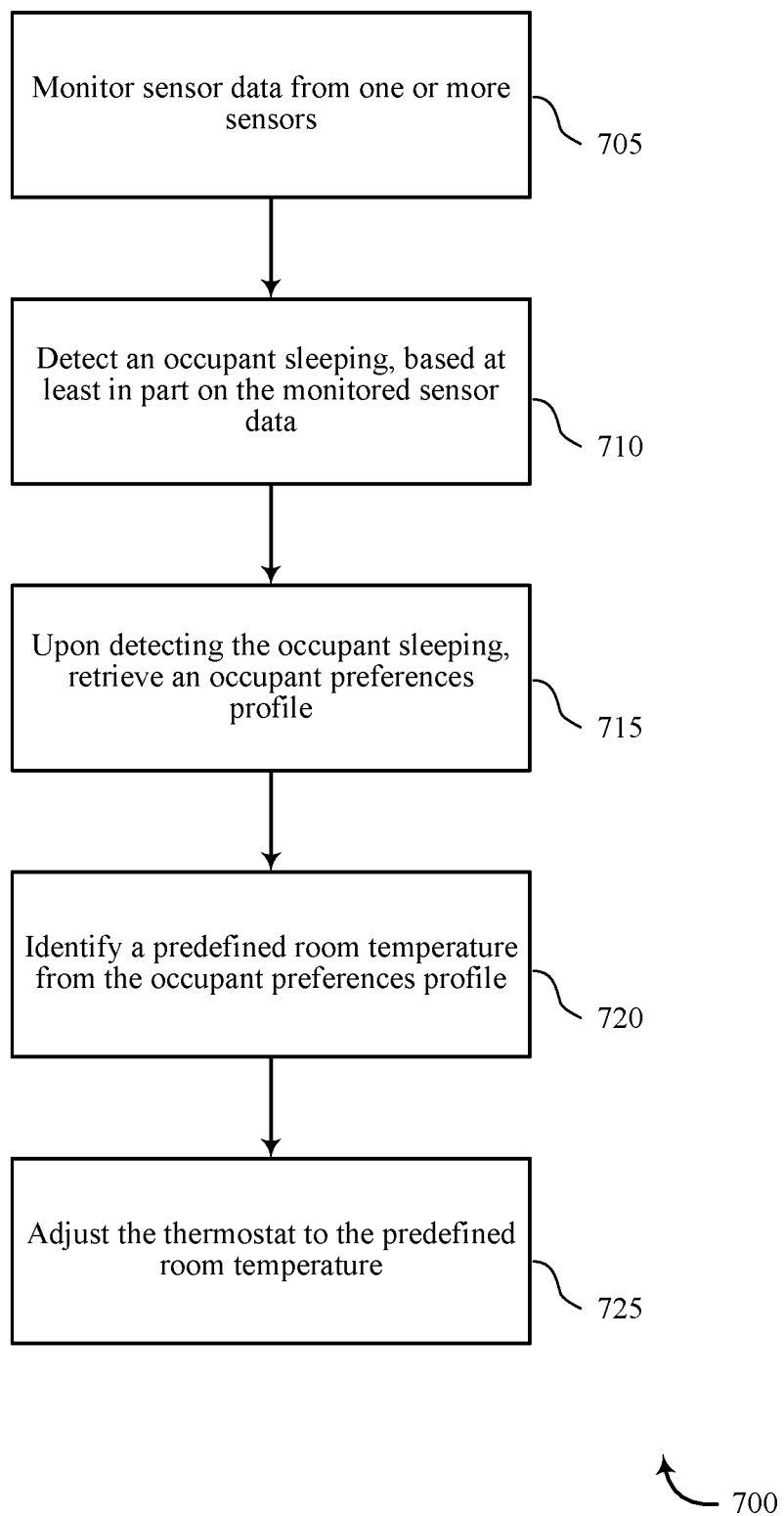
FIG. 7 is a flow chart illustrating an example of a method relating to a security and/or an automation system, in accordance with various aspects of this disclosure.

FIG. 7 is a flow chart illustrating an example of a method 700 for adjusting devices upon detecting occupant is asleep, in accordance with various aspects of the present disclosure. For clarity, the method 700 is described below with reference to aspects of one or more of the sensors 110 described with reference to FIGS. 1, 4, and/or 5. In some examples, a control panel, backend server, and/or one or more sensors may execute one or more sets of codes to control the functional elements of the security/automation system to perform the functions described below. Additionally or alternatively, the control panel, backend server, and/or one or more sensors may perform one or more of the functions described below using special-purpose hardware.

At block 705, the method 700 may include monitoring sensor data from one or more sensors. For example, the method 700 may monitor a motion sensor, a camera, a sound machine, a space heater, a vital sign monitor, etc. At block 710, the method 700 may include detecting an occupant sleeping, based on the monitored sensor data. For example, the method 700 may detect an occupant is sleeping if the motion sensor does not detect any motion for a predetermined period of time. Upon detecting the occupant sleeping, at block 715, the method 700 may include retrieving an occupant preferences profile. At block 720, the method 700 may include identifying a predefined room temperature from the occupant preferences profile. At block 725, the method 700 may include adjusting the thermostat to the predefined room temperature.

The operation(s) of method 700 may be performed using the device adjusting module 215 described with reference to FIGS. 2, 3, and/or 4. Thus, the method 700 may provide for adjusting devices upon detecting an occupant is asleep relating to automation/security systems. It should be noted that the method 700 is just one implementation and that the operations of the method 700 may be rearranged or otherwise modified such that other implementations are possible.

In some examples, aspects from two or more of the methods 600 and 700 may be combined and/or separated. It should be noted that the methods 600 and 700 are just example implementations, and that the operations of the methods 600 and 700 may be rearranged or otherwise modified such that other implementations are possible.

Figure 8:
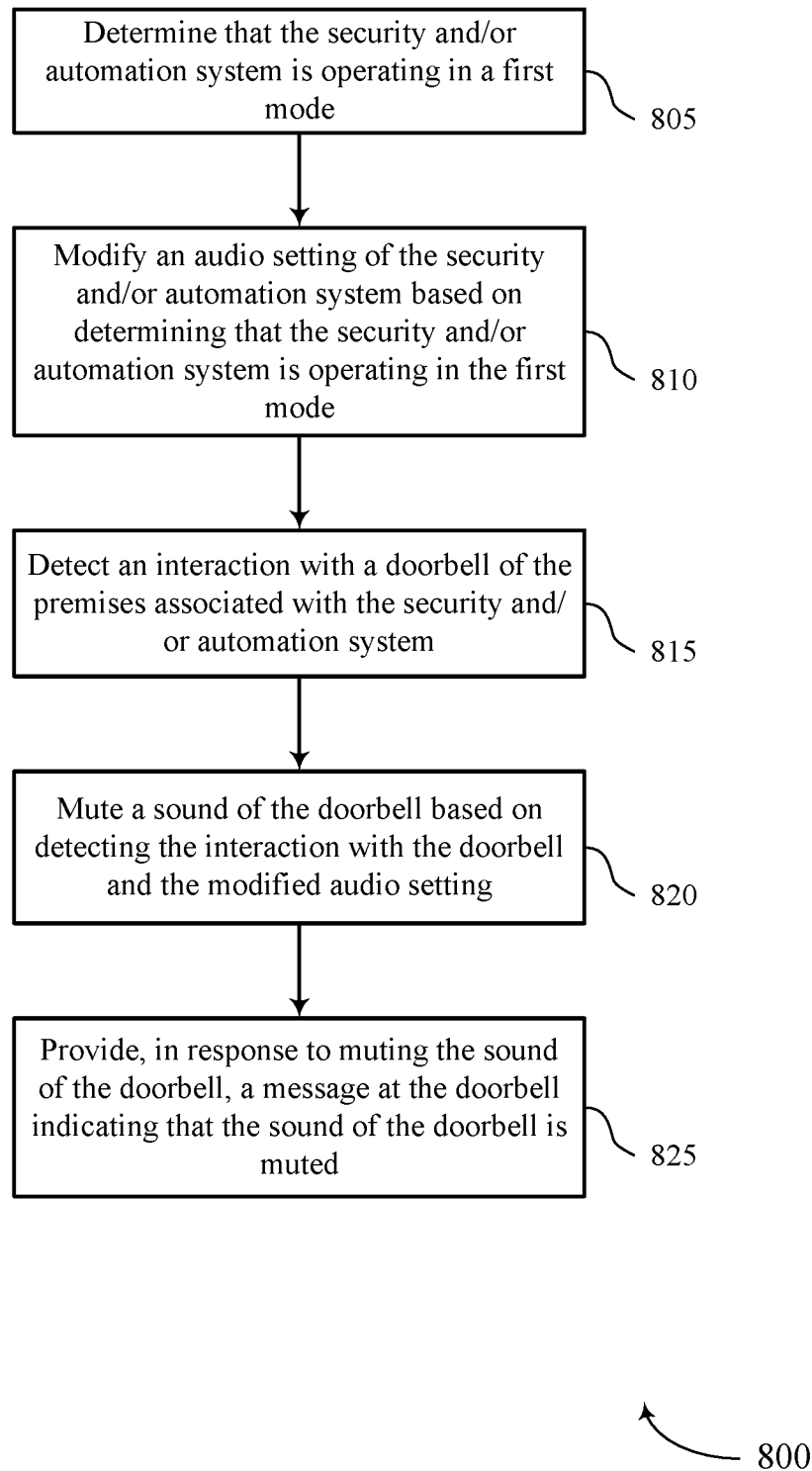
FIG. 8 is a flow chart illustrating an example of a method relating to a security and/or an automation system, in accordance with various aspects of this disclosure.

FIG. 8 shows a flowchart illustrating a method 800 for smart doorbell techniques in accordance with various aspects of the present disclosure. For clarity, the method 800 is described below with reference to aspects of one or more of the sensors 110 described with reference to FIGS. 1, 4, and/or 5. In some examples, a control panel, backend server, and/or one or more sensors may execute one or more sets of codes to control the functional elements of the security/automation system to perform the functions described below. Additionally or alternatively, the control panel, backend server, and/or one or more sensors may perform one or more of the functions described below using special-purpose hardware.

At block 805, the method 800 may include determining that the security and/or automation system is operating in a first mode. In some cases, the first mode may be an example of a do-not-disturb mode. In some cases, determining that the security and/or automation system is operating in the first mode is based on receiving an input from an individual associated with the security and/or automation system, one or more identified settings associated with the security and/or automation system (e.g., a do-not-disturb time period, a noise threshold, an occupancy of the premises, or any combination thereof), detecting that an occupant is sleeping based on monitored sensor data, or any combination thereof.

At block 810, the method 800 may include modifying an audio setting of the security and/or automation system based on determining that the security and/or automation system is operating in the first mode. In some cases, modifying the one or more settings may include modifying an audio setting of a chime connected to a doorbell at a premises associated with the home automation system. For example, modifying the audio setting associated with the home automation system may include adjusting a volume of a chime of a doorbell, muting the chime of the doorbell, bypassing the chime of the doorbell, modifying the chime of the doorbell from a first type of chime to a second type of chime, muting one or more speakers located within the home, activating a sound machine near a location of the occupant, or any combination thereof.

At block 815, the method 800 may include detecting an interaction with a doorbell of the premises associated with the security and/or automation system. In some cases, detecting the interaction with the doorbell may be based on an individual (e.g., a visitor) pressing a doorbell button or otherwise activating a doorbell function of the security and/or automation system. At block 820, the method 800 may include muting a sound of the doorbell based on detecting the interaction with the doorbell and the modified audio setting. In some cases, the method 800 may include routing a doorbell notification to an alternative destination. In some cases, the doorbell notification includes at least one of a sound emitted from a mobile device, a notification displayed on a home automation application, a message displayed on the mobile device, a message displayed on a television screen, a message displayed on a control panel of the security and/or automation system, and flashing a light of a sensor of the security and/or automation system, or any combination thereof.

At block 825, the method 800 may include providing, in response to muting the sound of the doorbell, a message at the doorbell indicating that the sound of the doorbell is muted. In some cases, the message may indicate to interact with the doorbell a second time if one or more conditions are satisfied. As an illustrative example, the message may instruct a visitor at the doorbell to press the doorbell a second time if they are not a solicitor, if there is an emergency, etc. Additionally or alternatively, the message may indicate information (e.g., the doorbell is muted, an occupant of the house is asleep or does not wish to be disturbed, etc.).

The operation(s) of method 800 may be performed using the device adjusting module 215 described with reference to FIGS. 2, 3, and/or 4. Thus, the method 800 may provide for one or more smart doorbell techniques relating to automation/security systems. It should be noted that the method 800 is just one implementation and that the operations of the method 800 may be rearranged or otherwise modified such that other implementations are possible.

Figure 9:
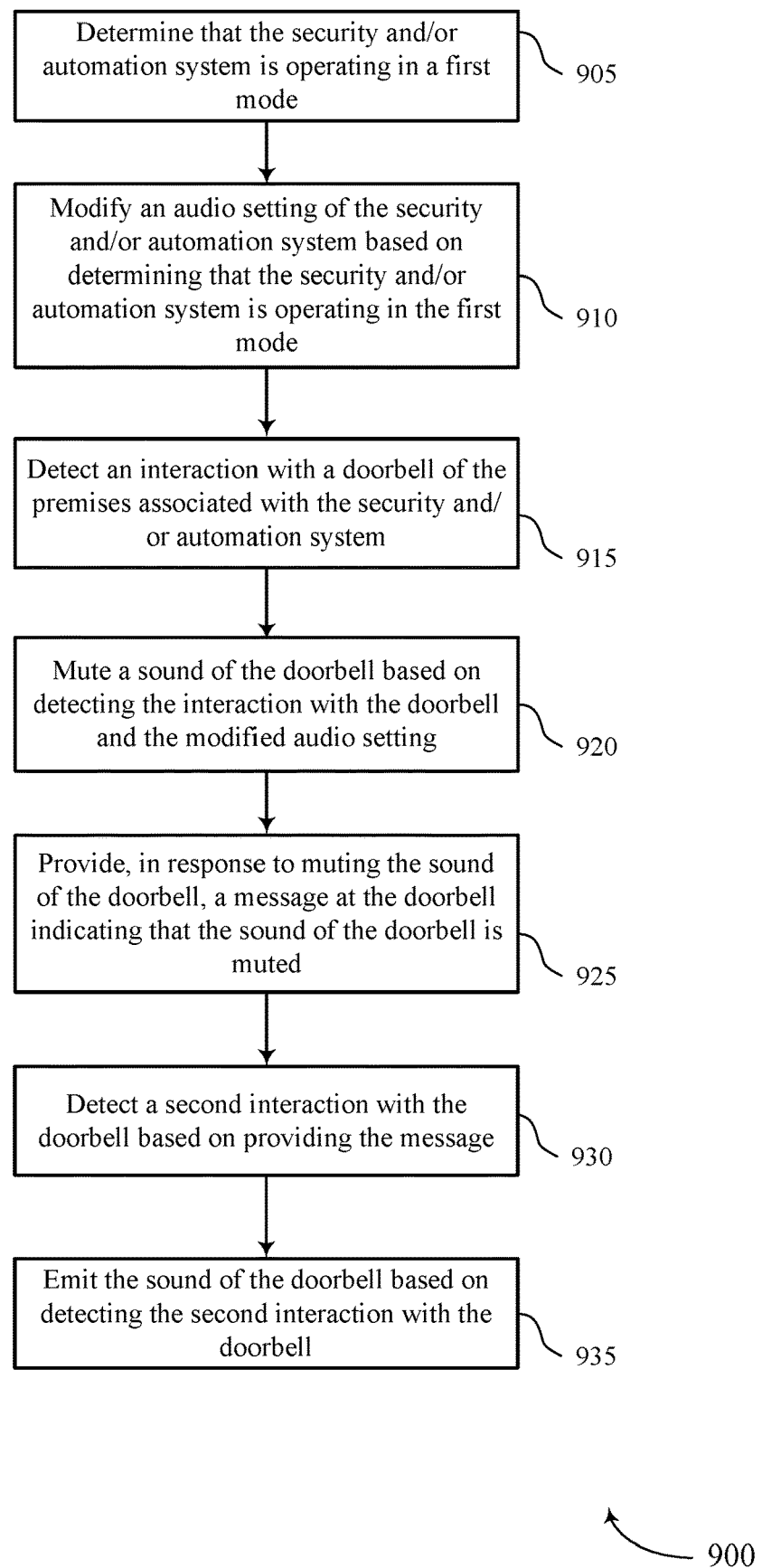
FIG. 9 is a flow chart illustrating an example of a method relating to a security and/or an automation system, in accordance with various aspects of this disclosure.

FIG. 9 shows a flowchart illustrating a method 900 that supports smart doorbell in accordance with aspects of the present disclosure. For clarity, the method 900 is described below with reference to aspects of one or more of the sensors 110 described with reference to FIGS. 1, 4, and/or 5. In some examples, a control panel, backend server, and/or one or more sensors may execute one or more sets of codes to control the functional elements of the security/automation system to perform the functions described below. Additionally or alternatively, the control panel, backend server, and/or one or more sensors may perform one or more of the functions described below using special-purpose hardware.

At block 905, the method 900 may include determining that the security and/or automation system is operating in a first mode. At block 910, the method 900 may include modifying an audio setting of the security and/or automation system based on determining that the security and/or automation system is operating in the first mode. At block 915, the method 900 may include detecting an interaction with a doorbell of the premises associated with the security and/or automation system. At block 920, the method 900 may include muting a sound of the doorbell based on detecting the interaction with the doorbell and the modified audio setting. At block 925, the method 900 may include providing, in response to muting the sound of the doorbell, a message at the doorbell indicating that the sound of the doorbell is muted. At block 930, the method 900 may include detecting a second interaction with the doorbell based on providing the message. At block 935, the method 900 may include emitting the sound of the doorbell based on detecting the second interaction with the doorbell.

The operation(s) of method 900 may be performed using the device adjusting module 215 described with reference to FIGS. 2, 3, and/or 4. Thus, the method 900 may provide for one or more smart doorbell techniques relating to automation/security systems. It should be noted that the methods described herein describe possible implementations, and that the operations and the steps may be rearranged or otherwise modified and that other implementations are possible. Further, aspects from two or more of the methods may be combined.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can include RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method at a security and/or automation system associated with a premises, the method being performed by a computing device comprising at least one processor, the method comprising:
   determining that the security and/or automation system is operating in a first mode;
   modifying an audio setting of the security and/or automation system based at least in part on determining that the security and/or automation system is operating in the first mode;
   detecting an interaction with a doorbell of the premises associated with the security and/or automation system;
   muting a sound of the doorbell based at least in part on detecting the interaction with the doorbell and the modified audio setting;
   providing, in response to muting the sound of the doorbell, a message at the doorbell indicating that the sound of the doorbell is muted;
   detecting a second interaction with the doorbell based at least in part on providing the message; and
   emitting the sound of the doorbell based at least in part on detecting the second interaction with the doorbell.

2. The method of claim 1, further comprising modifying the sound of the doorbell from a first type of chime to a second type of chime.

3. The method of claim 1, wherein the message comprises an audio message, a display message, an indication that an occupant of the premises is sleeping, an indication that the security and/or automation system is operating in the first mode, a query of an identity of a person interacting with the doorbell, a query of an intent of the person interacting with the doorbell, an instruction to interact with the doorbell, or any combination thereof.

4. The method of claim 1, further comprising:
   determining a doorbell notification based at least in part on detecting the interaction with the doorbell; and
   routing the doorbell notification to an alternative destination based at least in part on muting the sound of the doorbell.

5. The method of claim 4, wherein the doorbell notification includes at least one of a sound emitted from a mobile device, a notification displayed on a home automation application, a message displayed on the mobile device, a message displayed on a television screen, a message displayed on a control panel of the security and/or automation system, and flashing a light of a sensor of the security and/or automation system, or any combination thereof.

6. The method of claim 1, further comprising:
   determining that the security and/or automation system is operating in a second mode;
   detecting a second interaction with the doorbell of the premises associated with the security and/or automation system; and
   refraining from muting a second sound of the doorbell based at least in part on determining that the security and/or automation system is operating in the second mode.

7. The method of claim 1, further comprising:
   receiving an input from an individual associated with the security and/or automation system, wherein determining that the security and/or automation system is operating in the first mode is based at least in part on the received input.

8. The method of claim 1, further comprising:
   identifying one or more settings associated with the security and/or automation system, wherein determining that the security and/or automation system is operating in the first mode is based at least in part on the one or more settings.

9. The method of claim 8, wherein the one or more settings comprise at least one of a do-not-disturb time period, a noise threshold, an occupancy of the premises, or any combination thereof.

10. The method of claim 1, further comprising:
monitoring sensor data from one or more sensors associated with the security and/or automation system; and
detecting an occupant sleeping based at least in part on the monitored sensor data, wherein determining that the security and/or automation system is operating in the first mode is based at least in part on detecting the occupant sleeping.

11. The method of claim 1, wherein the first mode comprises a do-not disturb mode.

12. The method of claim 1, wherein the security and automation system comprises a camera sensor, a motion sensor, a speaker, a control panel, a transceiver, the doorbell, a light, or any combination thereof.

13. An apparatus for a security and/or automation system associated with a premises, the apparatus comprising:
at least one processor,
memory coupled with the processor; and
instructions stored in the memory and executable by the processor to cause the apparatus to:
determine that the security and/or automation system is operating in a first mode;
modify an audio setting of the security and/or automation system based at least in part on determining that the security and/or automation system is operating in the first mode;
detect an interaction with a doorbell of the premises associated with the security and/or automation system;
mute a sound of the doorbell based at least in part on detecting the interaction with the doorbell and the modified audio setting;
provide, in response to muting the sound of the doorbell, a message at the doorbell indicating that the sound of the doorbell is muted;
detect a second interaction with the doorbell based at least in part on providing the message; and
emit the sound of the doorbell based at least in part on detecting the second interaction with the doorbell.

14. The apparatus of claim 13, wherein the instructions are further executable by the processor to cause the apparatus to:
modify the sound of the doorbell from a first type of chime to a second type of chime.

15. The apparatus of claim 13, wherein the message comprises an audio message, a display message, an indication that an occupant of the premises is sleeping, an indication that the security and/or automation system is operating in the first mode, a query of an identity of a person interacting with the doorbell, a query of an intent of the person interacting with the doorbell, an instruction to interact with the doorbell, or any combination thereof.

16. The apparatus of claim 13, wherein the instructions are further executable by the processor to cause the apparatus to:
determine a doorbell notification based at least in part on detecting the interaction with the doorbell; and
route the doorbell notification to an alternative destination based at least in part on muting the sound of the doorbell.

17. The apparatus of claim 16, wherein the doorbell notification includes at least one of a sound emitted from a mobile device, a notification displayed on a home automation application, a message displayed on the mobile device, a message displayed on a television screen, a message displayed on a control panel of the security and/or automation system, and flashing a light of a sensor of the security and/or automation system, or any combination thereof.

18. The apparatus of claim 13, wherein the instructions are further executable by the processor to cause the apparatus to:
determine that the security and/or automation system is operating in a second mode;
detect a second interaction with the doorbell of the premises associated with the security and/or automation system; and
refrain from muting a second sound of the doorbell based at least in part on determining that the security and/or automation system is operating in the second mode.

19. A non-transitory computer-readable medium storing computer executable code, the code executable by a processor to:
determine that the security and/or automation system is operating in a first mode;
modify an audio setting of the security and/or automation system based at least in part on determining that the security and/or automation system is operating in the first mode;
detect an interaction with a doorbell of the premises associated with the security and/or automation system;
mute a sound of the doorbell based at least in part on detecting the interaction with the doorbell and the modified audio setting;
provide, in response to muting the sound of the doorbell, a message at the doorbell indicating that the sound of the doorbell is muted;
detect a second interaction with the doorbell based at least in part on providing the message; and
emit the sound of the doorbell based at least in part on detecting the second interaction with the doorbell.

20. The non-transitory computer-readable medium of claim 19, wherein the code is executable by the processor to:
modify the sound of the doorbell from a first type of chime to a second type of chime.

* * * * *